United States Patent
Woo et al.

(10) Patent No.: US 12,440,536 B2
(45) Date of Patent: Oct. 14, 2025

(54) COMPOSITIONS OF TOLL-LIKE RECEPTOR 5 (TLR5) AGONIST AND METHODS OF USE THEREOF

(71) Applicant: The University of Hong Kong, Hong Kong (HK)

(72) Inventors: Connie Wai Hong Woo, Kennedy Town (HK); Jensen Ho Cheung Yiu, North Point (HK)

(73) Assignee: The University Of Hong Kong, Hong Kong (HK)

( * ) Notice: Subject to any disclaimer, the term of this patent is extended or adjusted under 35 U.S.C. 154(b) by 271 days.

(21) Appl. No.: 16/414,566

(22) Filed: May 16, 2019

(65) Prior Publication Data
US 2019/0351014 A1    Nov. 21, 2019

Related U.S. Application Data

(60) Provisional application No. 62/673,461, filed on May 18, 2018.

(51) Int. Cl.
| | | |
|---|---|---|
| *A61K 38/16* | (2006.01) | |
| *A61K 9/00* | (2006.01) | |
| *A61P 9/10* | (2006.01) | |

(52) U.S. Cl.
CPC .......... *A61K 38/164* (2013.01); *A61K 9/0019* (2013.01); *A61P 9/10* (2018.01)

(58) Field of Classification Search
CPC .. A61K 38/164; A61K 9/0019; A61K 9/0024; A61K 9/0053; A61K 9/0095; A61K 9/08; A61K 9/10; A61K 9/107; A61K 9/1075; A61K 9/127; A61K 9/1641; A61K 9/1647; A61K 9/1652; A61K 9/2004; A61K 9/4841; A61P 9/10
See application file for complete search history.

(56) References Cited

U.S. PATENT DOCUMENTS

| | | |
|---|---|---|
| 3,266,987 A | 8/1966 | Crowley |
| 3,960,757 A | 6/1976 | Morishita |
| 4,460,563 A | 7/1984 | Calanchi |
| 4,794,000 A | 12/1988 | Ecanow |
| 4,886,748 A | 12/1989 | Asaka |
| 5,618,533 A | 4/1997 | Flavell |
| 5,888,810 A | 3/1999 | Meinersmann |
| 6,110,456 A | 8/2000 | During |
| 6,130,082 A | 10/2000 | Majarian |
| 6,585,980 B1 | 7/2003 | Chan |
| 6,620,617 B2 | 9/2003 | Mathiowitz |
| 7,915,381 B2 | 3/2011 | Aderem |
| 8,337,864 B2 | 12/2012 | Rhee |
| 8,703,146 B2 | 4/2014 | Aderem |
| 2003/0044429 A1 | 3/2003 | Aderem |
| 2017/0051021 A1 | 2/2017 | Colombatti |

FOREIGN PATENT DOCUMENTS

| | | | | |
|---|---|---|---|---|
| CN | 102784393 | 11/2012 | | |
| EP | 2349271 | 8/2011 | | |
| EP | 2349291 | 8/2011 | | |
| WO | WO-2010014957 A1 * | 2/2010 | .......... | A61K 31/355 |
| WO | 2011044246 | 4/2011 | | |
| WO | WO-2012097012 A1 * | 7/2012 | ............. | A61P 35/00 |
| WO | 201317468 | 2/2013 | | |
| WO | 2013134224 | 9/2013 | | |
| WO | 2015080631 | 6/2015 | | |

OTHER PUBLICATIONS

Zhenyu Cai, Activation of Toll-Like Receptor 5 on Breast Cancer Cells by Flagellin Suppresses Cell Proliferation and Tumor Growth, Cancer Res. Apr. 1, 2011; 71(7): 2466-2475.*
Erica Andersen-Nissen, Evasion of Toll-like receptor 5 by flagellated bacteria, PNAS Jun. 28, 2005 vol. 102 No. 26 9247-9252.*
Maryam Zamanian-Daryoush, Apolipoprotein A-I and Cancer, Frontiers in Pharmacology • Nov. 2015, pp. 1-10.*
InvivoGen, FLA-ST (Standard or Ultrapure) , accessed on May 5, 2021.*
Jinoh Kim, Flagellin-induced NADPH oxidase 4 activation is involved in atherosclerosis, Nature, Scientific Reports | 6:25437, 2016.*
Uniprot Protein Database, Protein accession P06179, accessed on May 5, 2021.*
David Garcia-Dorado, Protection Against Myocardial Ischemia-reperfusion Injury in Clinical Practice, Rev Esp Cardiol. 2014;67(5):394-404.*
Garcia-Dorado, Risk of coronary heart disease in patients with cancer: A nationwide follow-up study from Sweden, European Journal of Cancer 48 (2012) 121-128.*
Dympna J Connolly , New developments in Toll-like receptor targeted therapeutics, Current Opinion in Pharmacology 2012, 12:510-518.*

(Continued)

*Primary Examiner* — Lianko G Garyu
*Assistant Examiner* — Erinne R Dabkowski
(74) *Attorney, Agent, or Firm* — Pabst Patent Group LLP

(57) ABSTRACT

Compositions and method of increasing levels of apoA1 and/HDL in a subject in need thereof are provided. The compositions include one or more TLR5 agonists in a pharmaceutically acceptable carrier in an effective amount to increase the level of apoA1 and/or HDL in a subject. In a preferred embodiment, the composition is an oral formulation of the one or more TLR5 agonists. The disclosed methods include administering compositions containing the one or more TLR5 agonists to a subject in need thereof, in an effective amount to increase levels of apoA1 and/or HDL in the subject. In one preferred embodiment, the subject is at risk of developing atherosclerosis and/or coronary heart disease. In some embodiments, the subject is diagnosed as having atherosclerosis. The disclosed compositions can also be administered to subjects presenting with hyperlipidemia or hypercholesterolemia.

3 Claims, 9 Drawing Sheets
Specification includes a Sequence Listing.

(56) References Cited

OTHER PUBLICATIONS

Laskowitz, Apolipoprotein E-deficient mice have increased susceptibility to focal cerebral ischemia, Jul. 1997; 17(7):753-8, J Cerebral Blood Flow Metab.*
P J Kuhlencordt , Accelerated atherosclerosis, aortic aneurysm formation, and ischemic heart disease in apolipoprotein E/endothelial nitric oxide synthase double-knockout mice , Circulation, . Jul. 24, 2001;104(4):448-54. d.*
Ballak, et al., "TLR-3 is present in human adipocytes, but its signalling is not required for obesity-induced inflammation in adipose tissue in vivo", PLoS One, 10:e0123152 (2015).
Beck, et al, "New long-acting injectable microcapsule contraceptive system", Am J Obstet Gynecol, 135(3):419-26 (1979b).
Beck, et al., "A new long-acting injectable microcapsule system for the administration of progesterone", Fertil. Steril., 31:545-51 (1979a).
Benita, et al., "Characterization of drug-loaded poly(d,I-lactide) microspheres", J. Pharm. Sci., 73:1721-4 (1984).
Bibbins-Diningo, et al., "Statin Use for the Primary Prevention of Cardiovascular Disease in Adults: US Preventive Services Task Force Recommendation Statement", JAMA, 316(19):1997-2007 (2016).
Boekholdt, et al., "Levels and changes of HDL cholesterol and apolipoprotein A-I in relation to risk of cardiovascular events among statin-treated patients: a meta-analysis", Circulation, 12:1504-12 (2013).
Burdelya, et al, "An agonist of toll-like receptor 5 has radioprotective activity in mouse and primate models", Science, 320 (5873):226-30 (2008).
Chen, et al., "TRIF-dependent Toll-like receptor signaling suppresses Scd1 transcription in hepatocytes and prevents diet-induced hepatic steatosis", Sci Signal 10(491) eaal3336 (2017).
Chung, et al., "Oral interleukin-10 alleviates polyposis via neutralization of pathogenic T-regulatory cells", Cancer Res., 74(19):5377-85 (2014).
Coco, et al., "Drug delivery to inflamed colon by nanoparticles: comparison of different strategies", Int. J. Phar., 440:3-12 (2013).
Donnelly, et al., "Two nonadjacent regions in enteroaggregative *Escherichia coli* flagellin are required for activation of toll-like receptor 5", J. Biol. Chem., 43:40456-61 (2002).
Ellenbroek, et al., "Leukocyte TLR5 deficiency inhibits atherosclerosis by reduced macrophage recruitment and defective T-cell responsiveness", Sci Rep, 16;7:4688 (2017).
Ermak, et al., "Uptake and transport of copolymer biodegradable microspheres by rabbit Peyer's patch M cells", Cell Tissue Res., 279(2):433-6 (1995).
Florence, et al., "The oral absorption of micro- and nanoparticulates: neither exceptional nor unusual", Pharm. Res., 14(3):259-66 (1997).
Gorad, et al., "Liver specific drug targeting strategies: A review", Int J of Pharmac Sci Res, 4(11):4145-57 (2013).
Hansson, et al., "The immune response in atherosclerosis: a double-edged sword", Nat Rev Immunol, 6:508-19 (2006).
HPS3/TIMI55-REVEAL Collaborative Group, et al., "Effects of Anacetrapib in Patients with Atherosclerotic Vascular Disease", N Engl J Med, 377:1217-27 (2017).

Jani, et al., "The uptake and translocation of latex nanospheres and microspheres after oral administration to rats", J. Pharm. Pharmacol, 41(12):809-12 (1989).
Kim, et al., "Flagellin-induced NADPH oxidase 4 activation is involved in atherosclerosis", Sci Rep, 5(6): 25437 (2016).
Lino, et al., "Genetics of structure and function of bacterial flagella", Ann. Rev. Genet., 11:161-82 (1977).
Mathiowitz, et al., "Morphology of polyanhydride microsphere delivery systems", J. Scanning Microscopy, 4:329-40 (1990).
Mimori-Kiyosue, et al., "Locations of terminal segments of flagellin in the filament structure and their roles in polymerization and polymorphism", J. Mol. Virol., 270:222-37 (1997).
Nayor, et al., "Recent Update to the US Cholesterol Treatment Guidelines: A Comparison With International Guidelines", Circulation, 133(18):1795-806 (2016).
Needleman and Wunsch, "A general method applicable to the search for similarities in the amino acid sequence of two proteins", J. Mol. Biol., 48: 443-53, (1970).
Nishimura, et al., "Tissue-specific mRNA expression profiles of human toll-like receptors and related genes", Biol. Pharm. Bull., 28(5):886-92 (2005).
Rosenson, et al., "Dysfunctional HDL and atherosclerotic cardiovascular disease", Nat Rev Cardiol , 13:48-60 (2016).
Samatey, et al., "Structure of the bacterial flagellar protofilament and implications for a switch for supercoiling", Nature, 41:331-7 (2001).
Schoenhals, et al, "Comparative analysis of flagellin sequences from *Escherichia coli* strains possessing serologically distinct flagellar filaments with a shared complex surface pattern", J. Bacteriol., 175:5395-402 (1993).
Seymour, et al., "Compensatory enlargement of human atherosclerotic coronary arteries", N. Engl. J. Med., 316 (22): 1371-5 (1987).
Shintani, et al., "Toll-like receptor 9 protects non-immune cells from stress by modulating mitochondrial ATP synthesis through the inhibition of SERCA2", EMBO Rep, 15:438-45 (2014).
Smith, et al., "Toll-like receptor 5 recognizes a conserved site on flagellin required for protofilament formation and bacterial motility", Nat. Immunol,. 4:1247-53 (2003).
Tobias, et al., "Toll-like receptors in atherosclerosis", Biochem Soc Trans, 35:1453-5 (2007).
Venugapol, et al., "Targeted delivery of silymarin to liver cells by galactosylated nanoparticles: in-vitro & in-vivo evaluation studies", Albanian J. Pharmaceutical Sci. 2(1):1-3 (2014).
Yamanaka, et al., "Engineering strategies to enhance nanoparticle-mediated oral delivery", J. Biomater. Sci. Polym Ed, 19:1549-70 (2008).
Yoon, "Structural basis of TLR5-flagellin recognition and signalin", Science, 17:335(6070):859-64 (2012).
Zhang, et al., "Pterostilbene, a novel natural plant conduct, inhibits high fat-induced atherosclerosis inflammation via NF-κB signaling pathway in Toll-like receptor 5 (TLR5) deficient mice", Biomed. Pharmacotherapy, 81:345-355 (2016).
Zhou, et al., "Lactosylated PLGA nanoparticles containing ε-polylysine for the sustained release and liver-targeted delivery of the negatively charged proteins", Int J Pharm, 478(2):633-43 (2015).

* cited by examiner

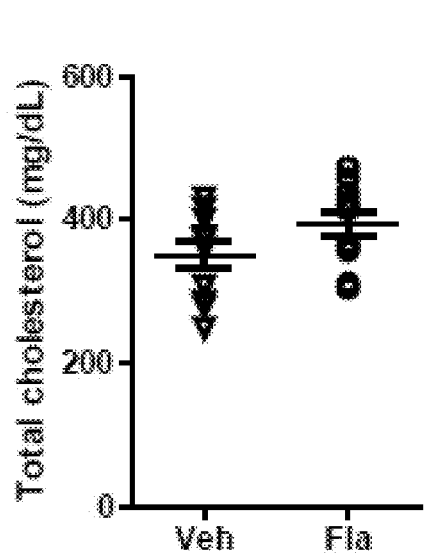
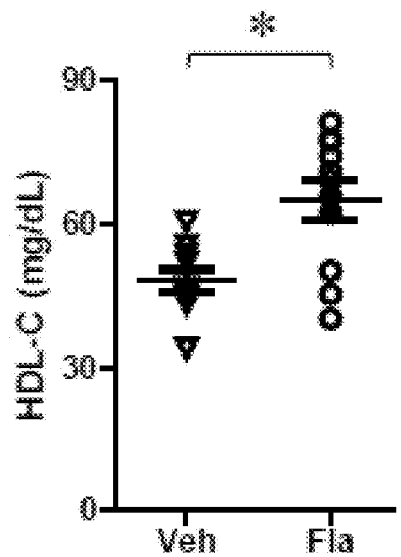
FIG. 6A  FIG. 6B
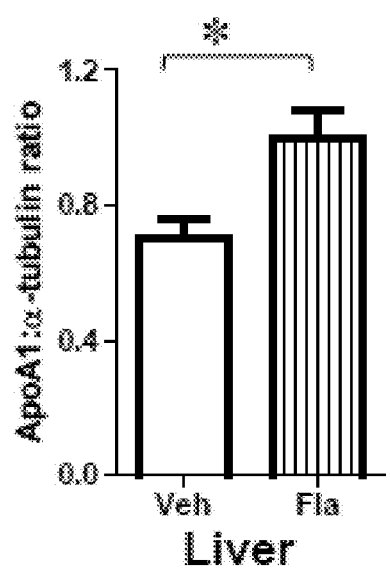
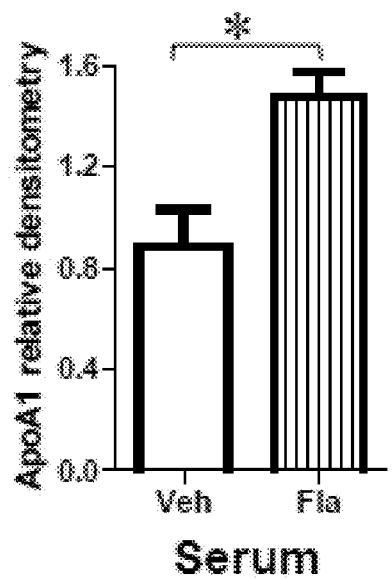
FIG. 7A  FIG. 7B

COMPOSITIONS OF TOLL-LIKE RECEPTOR 5 (TLR5) AGONIST AND METHODS OF USE THEREOF

CROSS-REFERENCE TO RELATED APPLICATIONS

This application claims benefit of U.S. Provisional Application No. 62/673,461, filed May 18, 2018, which hereby incorporated herein by reference in its entirety.

REFERENCE TO SEQUENCE LISTING

The Sequence Listing submitted as a text file named "UHK_00776_ST25.txt," created on May 15, 2019, and having a size of 34,403 bytes is hereby incorporated by reference pursuant to 37 C.F.R § 1.52(e)(5).

FIELD OF THE INVENTION

The present invention relates to a composition and method for treatment and prevention of one or more symptoms associated with atherosclerosis and its complications including coronary heart disease, cerebrovascular disease and peripheral vascular disease.

BACKGROUND OF THE INVENTION

Atherosclerosis is a pathological feature of stroke and heart attack, which are the leading causes of death worldwide. Two types of lipoproteins carry cholesterol to and from cells. One is low-density lipoprotein, or LDL. The other is high-density lipoprotein, or HDL. LDL contributes to fatty buildups in arteries. High low-density lipoprotein (LDL) and low high-density lipoprotein (HDL) are the major risk factors for atherosclerosis. Since the oxidized forms of LDL are more easily retained by the proteoglycans, LDL particles pose a risk for cardiovascular disease when they invade the endothelium and become oxidized. Increasing concentrations of LDL particles are strongly associated with the development of atherosclerosis over time. Seymour et al., *N. Engl. J. Med.* 316 (22): 1371-1375 (1987). By contrast, HDL-cholesterol (HDL-C) is strongly associated with the reduced cardiovascular risk even among the individual with very low LDL level (Boekholdt, et al., *Circulation* 12:1504-1512 (2013)). For every 1 mg/dl increase in HDL, a 2 and 3% reduction in coronary artery disease risk has been observed for men and women, respectively. HDL facilitates reverse cholesterol transport and prevents foam cells (lipid-laden macrophages) formation, a key etiological feature of atherogenesis, and is also considered as an anti-inflammatory molecule because of its ability to reduce adhesion molecules on endothelial cells and inhibit oxidation of LDL (Hansson, et al., *Nat Rev Immunol* 6:508-519 (2006)). HDL is the smallest of the lipoprotein particles. It is the densest because it contains the highest proportion of protein to lipids. Its most abundant apolipoproteins are apo A-I and apo A-II. The formation of HDL relies either on the de novo synthesis apolipoprotein-A1 (apo-A1) production or the repackaging of triglyceride-rich lipoprotein (e.g. very low-density lipoprotein (VLDL) and chylomicron) remnants Apo-A1 is the major protein component of HDL particles in plasma. The pre-β-HDL, which is a lipid-free HDL composed of apoA1, is produced by liver, and acquires phospholipids and cholesterol through its interaction with ATP-binding cassette transporters (e.g. ABCA1, ABCG1) present in peripheral cells such as macrophages (Rosenson, et al., *Nat Rev Cardiol* 13:48-60 (2016)). Through these mechanisms, cholesterol can be transferred from macrophages to HDL, preventing or reversing the formation of foam cells. Finding ways to increase ApoA1 and HDL is an important therapeutic goal to prevent atherogenesis and promote lesion regression.

Several classes of drugs have been used in treating hypercholesterolemia. The most popular drugs are statins, which inhibit the rate-limiting enzyme of cholesterol synthesis. Other therapies include accelerating bile acid production from cholesterol by increasing bile acid excretion, and inhibition of intestinal absorption of cholesterol. Although these agents are effective to decrease LDL, none of them specifically target lipoproteins. The precise risk factor for atherosclerosis is the increase in LDL or decrease in HDL, and suppression of cholesterol synthesis or absorption does not fully solve the problem. A new class of therapy uses PCSK9 (Proprotein convertase subtilisin/kexin type 9) which breaks down the LDL receptor, however, it is an injectable form, and for patients not responding to diet and statins. Several CETP (cholesteryl ester transfer protein) inhibitors which prevent the transfer of cholesterol from LDL to HDL were thought to increase HDL, but the clinical trials were terminated due to the failure of decrease atherosclerotic risk. The only one showing moderate increase in HDL was anacetrapib (Group, et al., *N Engl J Med* 377: 1217-1227 (2017)). The decrease in cardiovascular risk based on anacetrapid was associated with its effectiveness in decreasing LDL, rather than increasing HDL, and Merck terminated further development.

Thus there is still a need for treatment methods that can directly increase endogenous levels of apoA1 and/HDL in a subject in need thereof.

It is an object of the invention to provide compositions that increase levels of apoA1 and/HDL in a subject in need thereof.

It is also an object of the present invention to provide a method for increasing levels of apoA1 and/HDL in a subject in need thereof.

SUMMARY OF THE INVENTION

Compositions and methods of increasing levels of apoA1 and/HDL in a subject in need thereof are provided. The composition typically include one or more TLR5 agonist in a pharmaceutically acceptable carrier in an effective amount to increase physiological levels of apoA1 and/or HDL in a subject. In preferred embodiments, the composition is an oral formulation of the one or more TLR5 agonist.

Preferred TLR5 agonists are also provided and include flagellin and fragments, variants, and derivative thereof, for example, including the peptide:

```
                                                (SEQ ID NO: 3)
MRGSHHHHHHGMASMIGGQQMGRDLYDDDDKDPMAQVINTNSLSLLTQNN

LNKSQSSLSSAIERLSSGLRINSAKDDAAGQAIANRFTSNIKGLTQASRN

ANDGISIAQTTEGALNEINNNLQRVRELSVQATNGTNSDSDLKSIQDEIQ

QRLEEIDRVSNQTQFNGVKVLSQDNQMKIQVGANDGETITIDLQKIDVKS

LGLDGFNVNSPGISGGGGGILDSMGTLINEDAAAAKKSTANPLASIDSAL

SKVDAVRSSLGAIQNRFDSAITNLGNTVTNLNSARSRIEDADYATEVSNM

SKAQILQQAGTSVLAQANQVPQNVLSLLR,
``` or a variant thereof with at least 80% sequence identity thereto.

A preferred composition is an oral formulation including an effective amount of a TLR5 agonist to increase physiological levels of apoA1 and/or HDL in a subject. In a more preferred embodiment, the oral formulation is a pH-stable oral formulation.

The disclosed methods include administering compositions containing the one or more TLR5 agonists to a subject in need thereof, in an effective amount to increase physiological levels of apoA1 and/or HDL in the subject. In some preferred embodiments, the subject is at risk of developing atherosclerosis, coronary heart disease, or symptom or co-morbidity thereof. In some embodiments, the subject is diagnosed as having atherosclerosis. The disclosed compositions can also be administered to subjects presenting with hyperlipidemia or hypercholesterolemia.

BRIEF DESCRIPTION OF THE DRAWINGS

FIGS. 6A-6B dot plots showing total cholesterol (6A) and HDL-C (6B) following vehicle ("veh") or flagellin ("Fla") treatment.

FIGS. 7A-7B are bar graphs showing ApoA1 levels in the liver (7A) and serum (7B) following vehicle ("veh") or flagellin ("Fla") treatment.

DETAILED DESCRIPTION OF THE INVENTION

The Toll-like receptor (TLR) is one of the receptor families sensing bacteria or viruses and their products resulting in inflammatory response. TLRs are thought to exert negative effect on atherosclerosis due to their inflammatory nature. The activation of TLRs on immune cells, for example macrophages or dendritic cells results in production of proinflammatory molecules and promotion of foam cells formation in atherosclerotic lesion (Tobias, et al., *Biochem Soc Trans* 35:1453-1455 (2007)). For example, TLR5 deficiency in leukocytes was shown to inhibit atherosclerosis by reduced macrophage recruitment and defective T-cell responsiveness (Ellenbroek, et al., *Sci Rep* 7:42688 (2017)). Injection of recombinant flagellin promoted formation of atherosclerotic lesion in apoE-deficient animals fed a high fat diet (Kim, et al., *Sci Rep* 6: 25437 (2016)). Although several TLRs were shown to associate with atherosclerotic risk in genetic modified models, no inhibitor of TLRs was proven effective to prevent atherosclerosis in human studies. Various studies have demonstrated unique metabolic function of TLRs on non-immune or metabolic cell types (Chen, et al., *Sci Signal* 10(491) eaa13336 (2017); Ballak, et al., *PLoS One* 10:e0123152 (2015); and Shintani, et al., *EMBO Rep* 15:438-445 (2014)). The absence of evidence in TLR inhibitors in clinical studies is possibly because the effects of activation of TLRs in non-immune cells such as hepatocytes are often ignored.

Figure 1:
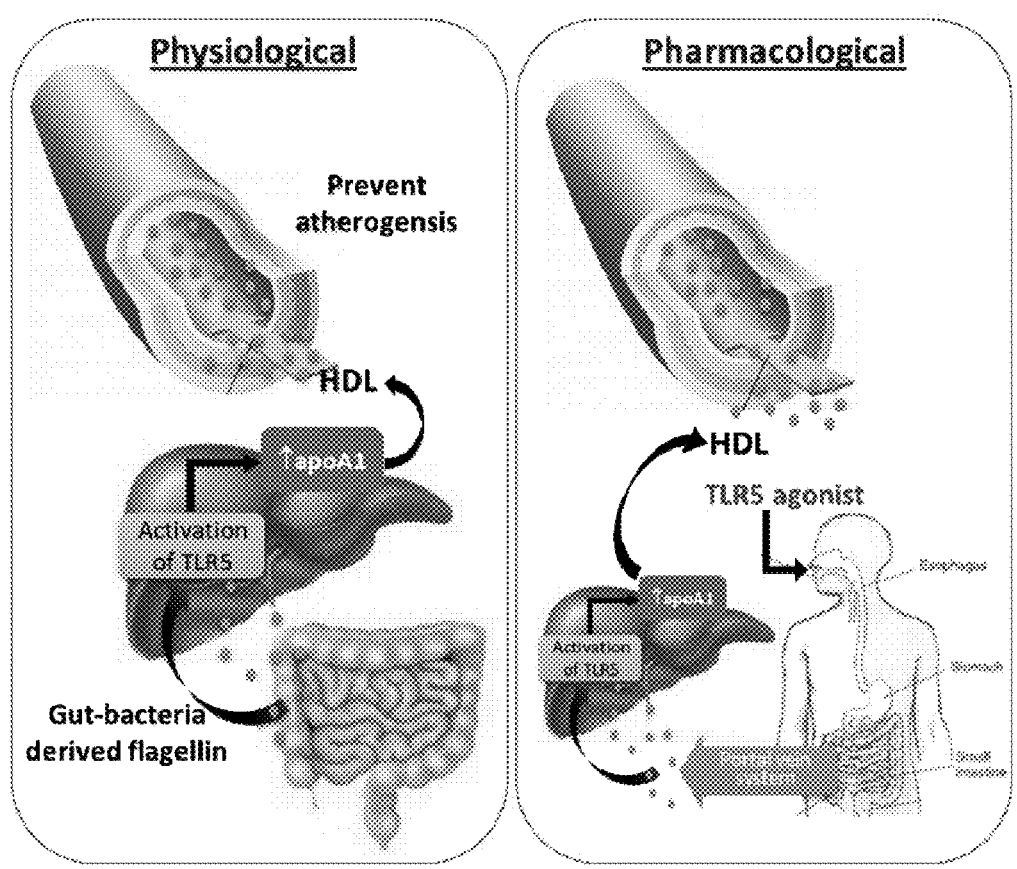
FIG. 1 is a schematic showing the physiological production of apoA1 by gut bacteria compared to pharmacological intervention to increase apoA1.

In response to a high-fat diet, the levels of flagellated bacteria increases in the gut leading to the increase of flagellin, a natural TLR5 agonist, which can enter the liver through the portal vein system and engage TLR5 on hepatocytes. The composition and methods disclosed herein are based at least on the discovery that activation of TLR5 can stimulate the production of apo-A1 in liver cells (hepatocytes), and increase circulating HDL levels. Activation of TLR5 through its agonist, e.g. flagellin or flagellin mimetic or derivative like entolimod, in hepatocytes can stimulate the production of apoA1 and eventually increase HDL level in the body. See, e.g., FIG. 1. TLR5 agonist acts on the receptor and turns on the MyD88 pathway in hepatocytes, resulting in the activation of a transcription factor, NFkappaB and subsequent stimulation of the transcription of apolipoprotein-A1, which is the key component of HDL. Since intestine cells can also produce apolipoprotein-A1, oral administration of TLR5 agonist should stimulate apolipoprotein-A1 production in intestine at the first contact and then in liver through the portal vein circulation.

Increasing HDL is the key strategy to prevent atherosclerosis. For every 1 mg/dl increase in HDL, a 2 and 3% reduction in coronary artery disease risk has been observed for men and women, respectively. It has also shown that increasing HDL plays more important role than lowering LDL in the prevention of atherosclerosis.

I. Definitions

The term "controlled release" or "modified release" refers to a release profile in which the active agent release characteristics of time course and/or location are chosen to accomplish therapeutic or convenience objectives not offered by conventional dosage forms such as solutions, suspensions, or promptly dissolving dosage forms. Delayed release, extended release, and pulsatile release and their combinations are examples of modified release.

As used herein, the term "peptide" is intended to mean two or more amino acids covalently bonded together.

"Pharmaceutically acceptable" as used herein refers to those compounds, materials, compositions, and/or dosage forms, which are, within the scope of sound medical judgment, suitable for use in contact with the tissues of human beings and animals without excessive toxicity, irritation, allergic response, or other problems or complications commensurate with a reasonable benefit/risk ratio.

A "subject" or "patient" refers to a human, primate, non-human primate, laboratory animal, farm animal, livestock, or a domestic pet.

The term "treat" or "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

The term "polypeptides" includes proteins and fragments thereof. Polypeptides are disclosed herein as amino acid residue sequences. Those sequences are written left to right in the direction from the amino to the carboxy terminus. In accordance with standard nomenclature, amino acid residue sequences are denominated by either a three letter or a single letter code as indicated as follows: Alanine (Ala, A), Arginine (Arg, R), Asparagine (Asn, N), Aspartic Acid (Asp, D), Cysteine (Cys, C), Glutamine (Gln, Q), Glutamic Acid (Glu, E), Glycine (Gly, G), Histidine (His, H), Isoleucine (Ile, I), Leucine (Leu, L), Lysine (Lys, K), Methionine (Met, M), Phenylalanine (Phe, F), Proline (Pro, P), Serine (Ser, S), Threonine (Thr, T), Tryptophan (Trp, W), Tyrosine (Tyr, Y), and Valine (Val, V).

"Variant" refers to a polypeptide or polynucleotide that differs from a reference polypeptide or polynucleotide, but retains essential properties. A typical variant of a polypeptide differs in amino acid sequence from another, reference polypeptide. Generally, differences are limited so that the sequences of the reference polypeptide and the variant are closely similar overall and, in many regions, identical. A variant and reference polypeptide may differ in amino acid sequence by one or more modifications (e.g., substitutions, additions, and/or deletions). A substituted or inserted amino acid residue may or may not be one encoded by the genetic code. A variant of a polypeptide may be naturally occurring such as an allelic variant, or it may be a variant that is not known to occur naturally.

Modifications and changes can be made in the structure of the polypeptides of in disclosure and still obtain a molecule having similar characteristics as the polypeptide (e.g., a conservative amino acid substitution). For example, certain amino acids can be substituted for other amino acids in a sequence without appreciable loss of activity. Because it is the interactive capacity and nature of a polypeptide that defines that polypeptide's biological functional activity, certain amino acid sequence substitutions can be made in a polypeptide sequence and nevertheless obtain a polypeptide with like properties.

In making such changes, the hydropathic index of amino acids can be considered. The importance of the hydropathic amino acid index in conferring interactive biologic function on a polypeptide is generally understood in the art. It is known that certain amino acids can be substituted for other amino acids having a similar hydropathic index or score and still result in a polypeptide with similar biological activity. Each amino acid has been assigned a hydropathic index on the basis of its hydrophobicity and charge characteristics. Those indices are: isoleucine (+4.5); valine (+4.2); leucine (+3.8); phenylalanine (+2.8); cysteine/cysteine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5); aspartate (−3.5); asparagine (−3.5); lysine (−3.9); and arginine (−4.5).

It is believed that the relative hydropathic character of the amino acid determines the secondary structure of the resultant polypeptide, which in turn defines the interaction of the polypeptide with other molecules, such as enzymes, substrates, receptors, antibodies, antigens, and the like. It is known in the art that an amino acid can be substituted by another amino acid having a similar hydropathic index and still obtain a functionally equivalent polypeptide. In such changes, the substitution of amino acids whose hydropathic indices are within ±2 is preferred, those within ±1 are particularly preferred, and those within ±0.5 are even more particularly preferred.

Substitution of like amino acids can also be made on the basis of hydrophilicity, particularly, where the biological functional equivalent polypeptide or peptide thereby created is intended for use in immunological embodiments. The following hydrophilicity values have been assigned to amino acid residues: arginine (+3.0); lysine (+3.0); aspartate (+3.0±1); glutamate (+3.0±1); serine (+0.3); asparagine (+0.2); glutamine (+0.2); glycine (0); proline (−0.5±1); threonine (−0.4); alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4). It is understood that an amino acid can be substituted for another having a similar hydrophilicity value and still obtain a biologically equivalent, and in particular, an immunologically equivalent polypeptide. In such changes, the substitution of amino acids whose hydrophilicity values are within ±2 is preferred, those within ±1 are particularly preferred, and those within ±0.5 are even more particularly preferred.

As outlined above, amino acid substitutions are generally based on the relative similarity of the amino acid side-chain substituents, for example, their hydrophobicity, hydrophilicity, charge, size, and the like. Exemplary substitutions that take various of the foregoing characteristics into consideration are well known to those of skill in the art and include (original residue: exemplary substitution): (Ala: Gly, Ser), (Arg: Lys), (Asn: Gln, His), (Asp: Glu, Cys, Ser), (Gln: Asn), (Glu: Asp), (Gly: Ala), (His: Asn, Gln), (Ile: Leu, Val), (Leu: Ile, Val), (Lys: Arg), (Met: Leu, Tyr), (Ser: Thr), (Thr: Ser), (Tip: Tyr), (Tyr: Trp, Phe), and (Val: Ile, Leu). Embodiments of this disclosure thus contemplate functional or biological equivalents of a polypeptide as set forth above. In particular, embodiments of the polypeptides can include variants having about 50%, 60%, 70%, 80%, 90%, and 95% sequence identity to the polypeptide of interest.

"Identity," as known in the art, is a relationship between two or more polypeptide sequences, as determined by comparing the sequences. In the art, "identity" also means the degree of sequence relatedness between polypeptide as determined by the match between strings of such sequences. "Identity" and "similarity" can be readily calculated by known methods, including, but not limited to, those described in (Computational Molecular Biology, Lesk, A. M., Ed., Oxford University Press, New York, 1988; Biocomputing: Informatics and Genome Projects, Smith, D. W., Ed., Academic Press, New York, 1993; Computer Analysis of Sequence Data, Part I, Griffin, A. M., and Griffin, H. G., Eds., Humana Press, New Jersey, 1994; Sequence Analysis in Molecular Biology, von Heinje, G., Academic Press, 1987; and Sequence Analysis Primer, Gribskov, M. and Devereux, J., Eds., M Stockton Press, New York, 1991; and Carillo, H., and Lipman, D., SIAM J Applied Math., 48: 1073 (1988).

Preferred methods to determine identity are designed to give the largest match between the sequences tested. Methods to determine identity and similarity are codified in publicly available computer programs. The percent identity between two sequences can be determined by using analysis software (i.e., Sequence Analysis Software Package of the Genetics Computer Group, Madison Wis.) that incorporates the *Needelman and Wunsch*, (J. Mol. Biol., 48: 443-453, 1970) algorithm (e.g., NBLAST, and XBLAST). The default parameters are used to determine the identity for the polypeptides of the present disclosure.

By way of example, a polypeptide sequence may be identical to the reference sequence, that is be 100% identical, or it may include up to a certain integer number of amino acid alterations as compared to the reference sequence such that the % identity is less than 100%. Such alterations are selected from: at least one amino acid deletion, substitution, including conservative and non-conservative substitution, or insertion, and wherein said alterations may occur at the amino- or carboxy-terminal positions of the reference polypeptide sequence or anywhere between those terminal positions, interspersed either individually among the amino acids in the reference sequence or in one or more contiguous groups within the reference sequence. The number of amino acid alterations for a given % identity is determined by multiplying the total number of amino acids in the reference polypeptide by the numerical percent of the respective percent identity (divided by 100) and then subtracting that product from said total number of amino acids in the reference polypeptide.

As used herein, the term "effective amount" or "therapeutically effective amount" means a dosage sufficient to treat, inhibit, or alleviate one or more symptoms of a disease state being treated or to otherwise provide a desired pharmacologic and/or physiologic effect. The precise dosage will vary according to a variety of factors such as subject-dependent variables (e.g., age, immune system health, etc.), the disease, and the treatment being effected.

II. Compositions

A. Toll-Like Receptor 5 Agonists

The disclosed compositions typically include an effective amount of one or more TLR5 agonists to increase physiological levels of apoA1 and/or HDL. A TLR5 agonist increases signal transduction through TLR5. The activation of this receptor mobilizes the nuclear factor NF-κB and stimulates tumor necrosis factor-alpha production. TLR5 agonists include small molecules, chemical compounds, and flagellin and memetic and derivatives. A TLR5 agonist can have an EC50 of less than about $10^{-7}$ M, such as less than $10^{-8}$ M and less than $10^{-9}$ M.

Additional examples of TLR5 agonists that can be included in the compositions disclosed herein is a flagellin polypeptide, and active fragment and variants thereof, or a polynucleotide encoding a flagellin polypeptide. The TLR5 agonist preferably is effective to increase physiological levels of ApoA1. Thus, typically the TLR5 agonist is effective to increase ApoA1 in a subject in need thereof, preferably in an effective amount to treat a cardiovascular disease or disorder such as atherosclerosis.

ApoA1 is the major HDL apolipoprotein and is important for normal production of HDL. The precursor of most plasma HDL is a discoidal particle containing ApoA1 and phospholipids called pre-β1 HDL, Discoidal pre-β1 HDL can acquire free (unesterified) cholesterol from the cell membranes of tissues, such as arterial wall macrophages by interacting with the class B, type I scavenger receptor to which the ApoA1 of HDL docks so the free cholesterol to or from the HDL particle. After free cholesterol is acquired by pre-β1 HDL, it is esterified, nonpolarized and moves into the core of the HDL.

1. Flagellin Proteins and Derivatives Thereof

Toll-like receptor 5 (TLR5) recognizes flagellin from both Gram-positive and Gram-negative bacteria. The flagellin can be bacterial flagellin, for example, flagellin purified from *Salmonella typhimurium, B. subtilis, P. aeruginosa, E. coli* or a recombinant form of flagellin.

In nature, flagellin has a molecular weight of approximately 40,000 daltons, and is composed of subunits arranged in several-stranded helix formation somewhat resembling myosin in structure. Exemplary flagellin proteins are described, for example, in U.S. Pat. Nos. 6,585,980; 6,130,082; 5,888,810; 5,618,533; and 4,886,748; U.S. Patent Publication No. US 2003/0044429 A1; and Donnelly et al., (2002) *J. Biol. Chem.* 43: 40456, all incorporated herein by reference. In nature, flagellin includes (i) a flagellin N-terminal constant region; and (ii) a flagellin C-terminal constant region and (iii) a flagellin hypervariable region between the constant regions. The conserved C-terminal and N-terminal regions of flagellin are well known in the art and have been described, for example, in Mimori-Kiyosue et al., (1997) *J. Mol. Virol.* 270:222-237; Lino et al., (1977) *Ann. Rev. Genet.* 11:161-182; and Schoenhals et al, (1993) *J. Bacteriol.* 175:5395-5402. The size of the constant region will vary somewhat depending on the source of the flagellin protein. In general, the N-terminal constant domain includes the approximately 170 or 180 N-terminal amino acids of the protein, whereas the C-terminal constant domain typically spans the approximately 85 to 100 C-terminal amino acids. The central hypervariable region varies considerably by size and sequence among bacteria, and accounts for most of the difference in molecular mass. The N- and C-terminal constant regions of flagellin polypeptides from a variety of bacteria are known, and others can be readily identified by using known alignment techniques, which are facilitated by the elucidation of the crystal structure of the flagellin monomer (Samatey et al., (2001) *Nature* 41:331).

A "flagellin N-terminal constant region" and "flagellin C-terminal constant region" as used herein includes active fragments (such as fragments of at least about 50, 100 or 120 amino acids in length) and modifications of any of the foregoing that enhance the immune response (such as, but not limited to, by activating the TLR5 pathway). In one example, the flagellin N-terminal constant regions includes at least 50, at least 100, at least 150, at least 170 or at least 180 amino acids of the N-terminal amino acid sequence of flagellin. In one example, the flagellin C-terminal constant regions includes at least 50, at least 60, at least 70, at least 80, at least 90, or at least 100 amino acids of the C-terminal amino acid sequence of flagellin. In some embodiments, the flagellin N-terminal and/or C-terminal constant region includes the full-length region or, alternatively, can include only a fragment of one or both regions. In particular embodiments, the N-terminal and/or C-terminal constant region includes a TLR5 recognition site(s) and is able to activate the TLR5 pathway. Regions of the flagellin protein involved in TLR5 signaling have been identified, for example, by Smith et al. (2003) *Nat. Immunol.* 4:1247-1253 (e.g., amino acids 78-129, 135-173 and 394-444 of *S. typhimurium* flagellin or homologs or modified forms thereof).

In a preferred embodiment, the flagellin is from a species of *Salmonella*, a representative example of which is *S. dublin* (encoded by GenBank Accession Number M84972):

```
                                            (SEQ ID NO: 19)
MAQVINTNSLSLLTQNNLNKSQSSLSSAIERLSSGLRINSAKDDAAGQAI

ANRFTSNIKGLTQASRNANDGISIAQTTEGALNEINNNLQRVRELSVQAT

NGTNSDSDLKSIQDEIQQRLEEIDRVSNQTQFNGVKVLSQDNQMKIQVGA

NDGETITIDLQKIDVKSLGLDGFNVNGPKEATVGDLKSSFKNVTGYDTYA

AGADKYRVDINSGAVVTDAAAPDKVYVNAANGQLTTDDAENNTAVDLFKT

TKSTAGTAEAKAIAGAIKGGKEGDTFDYKGVTFTIDTKTGDDGNGKVSTT

INGEKVTLTVADIATGAADVNAATLQSSKNVYTSVVNGQFTFDDKTKNES

AKLSDLEANNAVKGESKITVNGAEYTANATGDKITLAGKTMFIDKTASGV

STLINEDAAAAKKSTANPLASIDSALSKVDAVRSSLGAIQNRFDSAITNL

GNTVTNLNSARSRIEDADYATEVSNMSKAQILQQAGTSVLAQANQVPQNV

LSLLR
```

An exemplary *E. Coli* flagellin is:

```
                                            (SEQ ID NO: 1)
MAQVINTNSL SLITQNNINK NQSALSSSIE RLSSGLRINS

AKDDAAGQAI ANRFTSNIKG LTQAARNAND GISVAQTTEG

ALSEINNNLQ RIRELTVQAT TGTNSDSDLD SIQDEIKSRL

DEIDRVSGQT QFNGVNVLAK DGSMKIQVGA NDGETITIDL

KKIDSDTLGL NGFNVNGKGT ITNKAATVSD LTSAGAKLNT

TTGLYDLKTE NTLLTTDAAF DKLGNGDKVT VGGVDYTYNA

KSGDFTTTKS TAGTGVDAAA QAADSASKRD ALAATLHADV

GKSVNGSYTT KDGTVSFETD SAGNITIGGS QAYVDDAGNL

TTNNAGSAAK ADMKALLKAA SEGSDGASLT FNGTEYTIAK

ATPATTTPVA PLIPGGITYQ ATVSKDVVLS ETKAAAATSS

ITFNSGVLSK TIGFTAGESS DAAKSYVDDK GGITNVADYT

VSYSVNKDNG SVTVAGYASA TDTNKDYAPA IGTAVNVNSA

GKITTETTSA GSATTNPLAA LDDAISSIDK FRSSLGAIQN
```

-continued
```
RLDSAVTNLN NTTTNLSEAQ SRIQDADYAT EVSNMSKAQI

IQQAGNSVLA KANQVPQQVL SLLQG
```

An exemplary *S. typhimurium* flagellin is:

```
                                            (SEQ ID NO: 2)
MAQVINTNSL SLLTQNNLNK SQSALGTAIE RLSSGLRINS

AKDDAAGQAI ANRFTANIKG LTQASRNAND GISIAQTTEG

ALNEINNNLQ RVRELAVQSA NSTNSQSDLD SIQAEITQRL

NEIDRVSGQT QFNGVKVLAQ DNTLTIQVGA NDGETIDIDL

KQINSQTLGL DSLNVQKAYD VKDTAVTTKA YANNGTTLDV

SGLDDAAIKA ATGGTNGTAS VTGGAVKFDA DNNKYFVTIG

GFTGADAAKN GDYEVNVATD GTVTLAAGAT KTTMPAGATT

KTEVQELKDT PAVVSADAKN ALIAGGVDAT DANGAELVKM

SYTDKNGKTI EGGYALKAGD KYYAADYDEA TGAIKAKTTS

YTAADGTTKT AANQLGGVDG KTEVVTIDGK TYNASKAAGH

DFKAQPELAE AAAKTTENPL QKIDAALAQV DALRSDLGAV

QNRFNSAITN LGNTVNNLSE ARSRIEDSDY ATEVSNMSRA

QILQQAGTSV LAQANQVPQN VLSLLR.
```

Additional Flagellin protein sequences are known in the art. Flagellin protein sequences from *C. tyrobutyricum*, *C. difficile*, *C. chauvoei*, and *Bacillus subtilis* are disclosed under GenBank accession numbers CAB44444.1, AAD46086.1, BAB13814.1, and NP_391416.1, respectively).

GenBank accession number CAB44444.1:

```
                                            (SEQ ID NO: 17)
MIINHNLMAN NALRNMNVNS NNASKAMEKL SSGLRINRAG

DDAAGLAISE KMRGQINGLN QASSNAQDSI SLIQTAEGAL

NETHSILQRM RTLAVQSSND TNTTTDRSAI QDEVNQLTDE

IDRIANTTEF NTQKLLDGSK VGLVDAKDAD ASVQLNTSAN

ISLASNFSTT SATGIADSFT VTITRTHGTA GATFASTDYD

VALVGGTELI EHSSSSLTYD TKAINLVGMI KCFSIRTNDT

IRKVSHVRTV KALSMQIGAI VTNMLIGINS MKATDIGVRN

TSGKALDIST ASKATGAITQ INNAIETVST QRSKLGAYQN

RLEHTINNLG TSSENLTSAE SRIRDVDMAS EMSEYSKNNI

LSQTAQAMLA QANQQTQ;
```

GenBank accession number AAD46086.1:

```
                                            (SEQ ID NO: 18)
MRVNTNVSAL IANNQMGRNV NAQSKSMEKL SSGVRIKRAA

DDAAGLAISE KMRAQIKGLD QAGRNVQDGI SVVQTAEGAL

EETGNILQRM RTLSVQSSNE TNTAEERQKI ADELLQLKDE

VERISSSIEF NGKKLLDGSS TEIRLQVGAN FGTNVAGTSN

NNNEIKVALV NTSSIMSKAG ITSSTIASLN ADGTSGTNAA
```

```
KQMVSSLDVA LKELNTSRAK LGAQQNRLES TQNNLNNTIE

NVTAAESRIR DTDVASEMVN LSKMNILVQA SQSMLAQANQ

QPQGVLQLLG S;
```

GenBank accession number 1A113814.1:

```
                                              (SEQ ID NO: 20)
MIINHNMNAL NAHRNMMGNI ATAGKSMEKL SSGLRINRAG

DDAAGLAISE KMRGQIRGLD QASRNAQDGI SLIQTAEGAL

AETHSILQRM RELSVQSAND TNVAVDRTAI QDEINSLTEE

INRISGDTEF NTQKLLDGGF KGEFQIGANS NQTVKLDIGN

MSAASLGLTT TNSLESKALT KDSNLADGTY KISGKNLVDT

NGNSVGTFDA ASKKITVNGK DTVFDKAALA ENAVLTVKSG

TAEIKNTMTG AATKLSSGNY EIKGTNVIKD GKLAGTFDAA

KKKLTIDGVG DVSEAELGFQ TSKMLDKVSF TINGSDVSTR

ELASGSIKTI NSAIEQVSTQ RSKLGAVQNR LEHTINNLNT

SSENLTAAES RVRDVDMAKE MMAFSKNNIL SQAAQAMLGQ

ANQQPQGVLQ LLR;
```

Genbank accession No. NP 391416.1

```
                                              (SEQ ID NO: 21)
MRINHNIAAL NTLNRLSSNN SASQKNMEKL SSGLRINRAG

DDAAGLAISE KMRGQIRGLE MASKNSQDGI SLIQTAEGAL

TETHAILQRV RELVVQAGNT GTQDKATDLQ SIQDEISALT

DEIDGISNRT EFNGKKLLDG TYKVDTATPA NQKNLVFQIG

ANATQQISVN IEDMGADALG IKEADGSIAA LHSVNDLDVT

KFADNAADTA DIGFDAQLKV VDEAINQVSS QRAKLGAVQN

RLEHTINNLS ASGENLTAAE SRIRDVDMAK EMSEFTKNNI

LSQASQAMLA QANQQPQNVL QLLR.
```

Non-limiting examples of flagellin proteins and derivatives thereof are known in the art. For example, suitable flagellin proteins and derivatives thereof are described in U.S. Pat. No. 7,638,485, the entire disclosure of which is incorporated herein by reference. In one embodiment, the flagellin protein derivative that is used in the invention is the *Salmonella* flagellin derivative known in the art as CBLB502 (Entolimod) which is also described in U.S. Pat. No. 7,638,485. Entolimod is a specific TLR5 agonist developed by Cleveland Biolabs Inc, and currently an investigational drug for potential immunotherapy for cancer and biodefence. It is available as an injectable form.

CBLB502 is a pharmacologically optimized TLR5 ligand has been developed from flagellin by replacing its hypervariable region with a short, flexible linker that connects two constant regions, which are essential and sufficient for TLR5 binding (see Burdelya et al, *Science*, 320 (5873):226-30 (2008), incorporated herein by reference). The structure and TLR5-binding properties of CBLB502 have been described in detail Burdelya et al, *Science*, 320 (5873):226-30 (2008). The amino acid sequence of CBLB502 is

```
                                              (SEQ ID NO: 3)
MRGSHHHHHHGMASMTGGQQMGRDLYDDDDKDPMAQVINTNSLSLLTQNN

LNKSQSSLSSAIERLSSGLRINSAKDDAAGQAIANRFTSNIKGLTQASRN

ANDGISIAQTTEGALNEINNNLQRVRELSVQATNGTNSDSDLKSIQDEIQ

QRLEEIDRVSNQTQFNGVKVLSQDNQMKIQVGANDGETITIDLQKIDVKS

LGLDGFNVNSPGISGGGGGILDSMGTLINEDAAAAKKSTANPLASIDSAL

SKVDAVRSSLGAIQNRFDSAITNLGNTVTNLNSARSRIEDADYATEVSNM

SKAQILQQAGTSVLAQANQVPQNVLSLLR.
```

The sequence derived from the FliC flagellin protein of *Salmonella enterica* serovar dublin (GenBank accession # AAA27081) in SEQ ID NO:3 is shown in bold font (amino acids 1-176 and 402-505 of the full-length protein). The 33 amino acids N-terminal to the first (1) residue (M) from FliC are from the pRSET B vector (Invitrogen, cat # V351-20) and include a His6-tag (dotted-underlining) and an enterokinase cleavage site (italics type). The underlined sequence between FliC residues 176 (N) and 402 (T) is from pGEX-KG and encodes a flexible linker domain. See Burdelya et al, *Science*, 320 (5873):226-30 (2008), FIG. S1B.

Briefly, CBLB502 is a recombinant protein of *Salmonella enterica* serovar Dublin flagellin that retains the N- and C-terminal domains responsible for specific binding and activation of TLR5 and is missing the globular domain encoded by a central part of the gene through substitution with a short artificial linker peptide. The resulting protein is half as long and 50 times less immunogenic than native flagellin while retaining its TLR5-dependent NF-kB-activating capacity. The highly purified cGMP grade rflagellin variant CBLB502 can be produced by Cleveland Biolabs, NY as previously described Burdelya et al, *Science*, 320 (5873):226-30 (2008); Yoon, *Science*, 2012 Feb. 17; 335 (6070):859-64 (2012). Briefly, the rflagellin cDNA (from *Salmonella* dublin) can be overexpressed in *E. coli* and a fusion protein of flagellin with an N-terminal His$_6$-tag can be purified to homogeneity by a combination of Ni-NTA chromatography and FPLC-based gel-filtration. The final product (>95% pure by SDS-PAGE) can be purified from residual LPS by passing though detoxigel (Pierce, Rockford, IL). This purification process obtains >100 mg of pure rflagellin from 6 L of bacterial culture.

Flagellin derived peptides that activate TLR5 are disclosed for example in U.S. Publication No. 2003/0044429 (U.S. Pat. No. 7,915,381) and include as examples, the amino acid sequences

```
                           (SEQ ID NO: 4)
GAVQNRFNSAIT;

(SEQ ID NO: 5)
GAVANRFNSAIT;

(SEQ ID NO: 6)
GAVQNAFNSAIT;

(SEQ ID NO: 7)
ADTRDLGAVQNRFNSAIT;

(SEQ ID NO: 8)
VDARDLGAVQNRFNSAIT;
and (SEQ ID NO: 9)
VDTADLGAVQNRFNSAIT.
```

Flagellin related polypeptides are also disclosed in U.S. Pat. No. 8,287,882.

U.S Publication No. 2005/0147627 discloses peptides that exhibit TLR5 binding, for example,

```
                                            (SEQ ID NO: 10)
GALNEINNNLQRVRELAVQSANSTNSQSDLDSIQAEITQ;

(SEQ ID NO: 11)
TQFSGVKVLAQDNTLTIQVGANDGETIDIDLKQINSQTLGLDTL;

(SEQ ID NO: 12)
EGALNEINNNLQRVRELAVQSANSTNQSDLDSIQAEITQRLNEIDRVNG;

(SEQ ID NO: 13)
MAQVINTNSLSLLTQNNLNKSQSALGTAIERLSSGLRINSAKDDAAGQAI

ANFTANIKGLTQASRNANDGISIAQTTEGALNEINNNLQRVRELAVQS;

(SEQ ID NO: 14)
LQKIDAALAQVDTLRSDLGAVQNRFTNSAITNL;

(SEQ ID NO: 15)
TLRSDLGAVQNRFNSAITNLGNTVNNLSS (SEQ ID NO: 16)
EQAAKTTENPLQKIDAALAQVDTLRSDLGAVQNRFNSAITNLGNTVNNLS
S.
```

In some embodiments, the flagellin protein or derivative thereof is a variant of any one of SEQ ID NOS:1-21 having at least 70%, 75%, 80%, 85%, 90%, or 95% sequence identity to any one of SEQ ID NOS:1-21, Typically, the variant retains the ability to induce signal transduction through TLR5, can increase physiological levels of apoA1 and/or HDL, or a combination thereof.

2. Nucleotides Encoding Flagellin Proteins and Derivatives Thereof

Some embodiments, the flagellin protein or derivative thereof is provided by a nucleotide expressing the protein or derivative thereof. This aspect includes using expression vectors that encode a TLR5, but does not encode a TLR5 agonist. The nucleotides which encode a TLR5 or a secreatable TLR5 agonist are present in viral vectors which are suitable for insertion into mammalian cells. Examples of suitable vectors include but are not limited to vectors derived from adenovirus, adeno-associated virus, retroviruses lentiviruses, Rhabdoviruses, murine leukemia virus), herpes virus, etc. In some preferred embodiments, cells to be infected are conferred the capability to express a secreted form of a TLR5 agonist, thereby facilitating activation of TLRs via local TLR5-stimulation. Any peptide signal that facilitates secretion of a protein can be operably linked to the TLR5 agonist to provide active secreted (extracellular) peptides (BASE) that would be suitable for use in the disclosed compositions and methods. Non-limiting examples of such secretion signals include the IL-1 sequence and derivatives thereof, the CD 14 signal sequence and derivatives thereof, and secreted placental alkaline phosphatase (SEAP). In one embodiment, the secretion signal is a truncated form of SEAP, whereby removal of the transmembrane domain of the protein allows it to be secreted from the cells into the surrounding environment.

A polypeptide may include an N-terminal methionine residue to facilitate expression of the recombinant polypeptide. The N-terminal Met and/or other residues or sequences that facilitate expression may be cleaved from the expressed recombinant polypeptide (e.g., the final product).

Full and partial sequences of *C. botulinum* flagellin genes were deposited in GenBank with the following accessions numbers: DQ658239; and flaA, DQ844946 to DQ845031.

Construction of lentiviral vector expressing secreted form for CBLB50 is described for example in WO 2014/098649.

B. Formulations

The compounds described herein can be formulated for enteral, parenteral, topical, or pulmonary administration. The compounds can be combined with one or more pharmaceutically acceptable carriers and/or excipients that are considered safe and effective and may be administered to an individual without causing undesirable biological side effects or unwanted interactions. The carrier is all components present in the pharmaceutical formulation other than the active ingredient or ingredients.

1. Enteral Formulations

A most preferred route of administration is oral administration of TLR5 agonist. Delivery of TLR5 agonist through the portal vein ensures the TLR5 agonist can act on and subsequently be degraded by the liver, while avoiding its action on peripheral and circulating immune cells and thus avoiding/minimizing eliciting inflammatory response. Oral dosage form of TLR5 agonist can act on liver specifically to increase apoA1 in hepatocytes and subsequently HDL in circulation, thus facilitate reverse cholesterol transport and decrease risk of atherosclerosis. A more preferred embodiment is an acidic pH stable oral formulation which allows a minimal dosing of agonist used to avoid non-specific action on intestinal or peripheral immune cells. The compositions include a therapeutically effective amount of one or more TLR5 agonists, in a pharmaceutically acceptable carrier suitable for oral administration.

Oral formulations can include standard carriers such as pharmaceutical grades of mannitol, lactose, sodium saccharine, starch, magnesium stearate, cellulose, magnesium carbonate, etc. Such compositions will contain a therapeutically effective amount of the compound and/or antibiotic together with a suitable amount of carrier, to provide the proper form to the patient based on the mode of administration to be used.

Suitable oral dosage forms include tablets, capsules, solutions, suspensions, syrups, and lozenges. Tablets can be made using compression or molding techniques well known in the art. Gelatin or non-gelatin capsules can prepared as hard or soft capsule shells, which can encapsulate liquid, solid, and semi-solid fill materials, using techniques well known in the art.

Formulations may be prepared using a pharmaceutically acceptable carrier. As generally used herein "carrier" includes, but is not limited to, diluents, preservatives, binders, lubricants, disintegrators, swelling agents, fillers, stabilizers, and combinations thereof. Carrier also includes all components of the coating composition, which may include plasticizers, pigments, colorants, stabilizing agents, and glidants.

Examples of suitable coating materials include, but are not limited to, cellulose polymers such as cellulose acetate phthalate, hydroxypropyl cellulose, hydroxypropyl methylcellulose, hydroxypropyl methylcellulose phthalate and hydroxypropyl methylcellulose acetate succinate; polyvinyl acetate phthalate, acrylic acid polymers and copolymers, and methacrylic resins that are commercially available under the trade name EUDRAGIT® (Roth Pharma, Westerstadt, Germany), zein, shellac, and polysaccharides.

Additionally, the coating material may contain conventional carriers such as plasticizers, pigments, colorants, glidants, stabilization agents, pore formers and surfactants.

Suitable diluents include, but are not limited to, dicalcium phosphate dihydrate, calcium sulfate, lactose, sucrose, mannitol, sorbitol, cellulose, microcrystalline cellulose, kaolin, sodium chloride, dry starch, hydrolyzed starches, pregelatinized starch, silicone dioxide, titanium oxide, magnesium aluminum silicate and powdered sugar.

"Binders" are used to impart cohesive qualities to a solid dosage formulation, and thus ensure that a tablet or bead or granule remains intact after the formation of the dosage forms. Suitable binder materials include, but are not limited to, starch, pregelatinized starch, gelatin, sugars (including sucrose, glucose, dextrose, lactose and sorbitol), polyethylene glycol, waxes, natural and synthetic gums such as acacia, tragacanth, sodium alginate, cellulose, including hydroxypropylmethylcellulose, hydroxypropylcellulose, ethylcellulose, and veegum, and synthetic polymers such as acrylic acid and methacrylic acid copolymers, methacrylic acid copolymers, methyl methacrylate copolymers, aminoalkyl methacrylate copolymers, polyacrylic acid/polymethacrylic acid and polyvinylpyrrolidone.

"Lubricants" are used to facilitate tablet manufacture. Examples of suitable lubricants include, but are not limited to, magnesium stearate, calcium stearate, stearic acid, glycerol behenate, polyethylene glycol, talc, and mineral oil.

"Disintegrants" are used to facilitate dosage form disintegration or "breakup" after administration, and generally include, but are not limited to, starch, sodium starch glycolate, sodium carboxymethyl starch, sodium carboxymethylcellulose, hydroxypropyl cellulose, pregelatinized starch, clays, cellulose, alginine, gums or cross linked polymers, such as cross-linked PVP (Polyplasdone® XL from GAF Chemical Corp).

"Stabilizers" are used to inhibit or retard drug decomposition reactions, which include, by way of example, oxidative reactions. Suitable stabilizers include, but are not limited to, antioxidants, butylated hydroxytoluene (BHT); ascorbic acid, its salts and esters; Vitamin E, tocopherol and its salts; sulfites such as sodium metabisulphite; cysteine and its derivatives; citric acid; propyl gallate, and butylated hydroxyanisole (BHA).

a. Controlled Release Enteral Formulations

Oral dosage forms, such as capsules, tablets, solutions, and suspensions, can for formulated for controlled release. For example, the one or more compounds and optional one or more additional active agents can be formulated into nanoparticles, microparticles, and combinations thereof, and encapsulated in a soft or hard gelatin or non-gelatin capsule or dispersed in a dispersing medium to form an oral suspension or syrup. The particles can be formed of the drug and a controlled release polymer or matrix. Alternatively, the drug particles can be coated with one or more controlled release coatings prior to incorporation in to the finished dosage form.

In another form, the one or more compounds and optional one or more additional active agents are dispersed in a matrix material, which gels or emulsifies upon contact with an aqueous medium, such as physiological fluids. In the case of gels, the matrix swells entrapping the active agents, which are released slowly over time by diffusion and/or degradation of the matrix material. Such matrices can be formulated as tablets or as fill materials for hard and soft capsules.

In still another form, the one or more compounds, and optional one or more additional active agents are formulated into a solid oral dosage form, such as a tablet or capsule, and the solid dosage form is coated with one or more controlled release coatings, such as a delayed release coatings or extended release coatings. The coating or coatings may also contain the compounds and/or additional active agents.

i. Extended Release Dosage Forms

The extended release formulations are generally prepared as diffusion or osmotic systems, which are known in the art. A diffusion system typically consists of two types of devices, a reservoir and a matrix, and is well known and described in the art. The matrix devices are generally prepared by compressing the drug with a slowly dissolving polymer carrier into a tablet form. The three major types of materials used in the preparation of matrix devices are insoluble plastics, hydrophilic polymers, and fatty compounds. Plastic matrices include, but are not limited to, methyl acrylate-methyl methacrylate, polyvinyl chloride, and polyethylene. Hydrophilic polymers include, but are not limited to, cellulosic polymers such as methyl and ethyl cellulose, hydroxyalkylcelluloses such as hydroxypropyl-cellulose, hydroxypropylmethylcellulose, sodium carboxymethylcellulose, and Carbopol® 934, polyethylene oxides and mixtures thereof. Fatty compounds include, but are not limited to, various waxes such as carnauba wax and glyceryl tristearate and wax-type substances including hydrogenated castor oil or hydrogenated vegetable oil, or mixtures thereof.

In certain preferred forms, the plastic material is a pharmaceutically acceptable acrylic polymer, including but not limited to, acrylic acid and methacrylic acid copolymers, methyl methacrylate, methyl methacrylate copolymers, ethoxyethyl methacrylates, cyanoethyl methacrylate, aminoalkyl methacrylate copolymer, poly(acrylic acid), poly (methacrylic acid), methacrylic acid alkylamine copolymer poly(methyl methacrylate), poly(methacrylic acid)(anhydride), polymethacrylate, polyacrylamide, poly(methacrylic acid anhydride), and glycidyl methacrylate copolymers.

In certain preferred forms, the acrylic polymer is composed of one or more ammonio methacrylate copolymers Ammonio methacrylate copolymers are well known in the art, and are described in NF XVII as fully polymerized copolymers of acrylic and methacrylic acid esters with a low content of quaternary ammonium groups.

In one preferred form, the acrylic polymer is an acrylic resin lacquer such as that which is commercially available from Rohm Pharma under the tradename EUDRAGIT®. In further preferred forms, the acrylic polymer includes a mixture of two acrylic resin lacquers commercially available from Rohm Pharma under the tradenames EUDRAGIT® RL30D and EUDRAGIT RS30D, respectively. EUDRAGIT® RL30 and EUDRAGIT® RS30 are copolymers of acrylic and methacrylic esters with a low content of quaternary ammonium groups, the molar ratio of ammonium groups to the remaining neutral (meth)acrylic esters being 1:20 in EUDRAGIT RL30 and 1:40 in EUDRAGIT® RS30D. The mean molecular weight is about 150,000. EUDRAGIT® S-100 and EUDRAGIT® L-100 are also preferred. The code designations RL (high permeability) and RS (low permeability) refer to the permeability properties of these agents. EUDRAGIT RL/RS mixtures are insoluble in water and in digestive fluids. However, multiparticulate systems formed to include the same are swellable and permeable in aqueous solutions and digestive fluids.

The polymers described above such as EUDRAGIT RL/RS may be mixed together in any desired ratio in order to ultimately obtain a sustained-release formulation having a desirable dissolution profile. Desirable sustained-release multiparticulate systems may be obtained, for instance, from 100% EUDRAGIT® RL, 50% EUDRAGIT® RL and 50% EUDRAGIT t® RS, and 10% EUDRAGIT® RL and 90% EUDRAGIT® RS. One skilled in the art will recognize that other acrylic polymers may also be used, such as, for example, EUDRAGIT® L.

Alternatively, extended release formulations can be prepared using osmotic systems or by applying a semi-permeable coating to the dosage form. In the latter case, the desired drug release profile can be achieved by combining low permeable and high permeable coating materials in suitable proportion.

The devices with different drug release mechanisms described above can be combined in a final dosage form comprising single or multiple units. Examples of multiple units include, but are not limited to, multilayer tablets and capsules containing tablets, beads, or granules. An immediate release portion can be added to the extended release system by means of either applying an immediate release layer on top of the extended release core using a coating or compression process or in a multiple unit system, such as a capsule containing extended and immediate release beads.

Extended release tablets containing hydrophilic polymers are prepared by techniques commonly known in the art such as direct compression, wet granulation, or dry granulation. Their formulations usually incorporate polymers, diluents, binders, and lubricants as well as the active pharmaceutical ingredient. The usual diluents include inert powdered substances such as starches, powdered cellulose, especially crystalline and microcrystalline cellulose, sugars such as fructose, mannitol and sucrose, grain flours and similar edible powders. Typical diluents include, for example, various types of starch, lactose, mannitol, kaolin, calcium phosphate or sulfate, inorganic salts such as sodium chloride and powdered sugar. Powdered cellulose derivatives are also useful. Typical tablet binders include substances such as starch, gelatin and sugars such as lactose, fructose, and glucose. Natural and synthetic gums, including acacia, alginates, methylcellulose, and polyvinylpyrrolidone can also be used. Polyethylene glycol, hydrophilic polymers, ethylcellulose and waxes can also serve as binders. A lubricant is necessary in a tablet formulation to prevent the tablet and punches from sticking in the die. The lubricant is chosen from such slippery solids as talc, magnesium and calcium stearate, stearic acid and hydrogenated vegetable oils.

Extended release tablets containing wax materials are generally prepared using methods known in the art such as a direct blend method, a congealing method, and an aqueous dispersion method. In the congealing method, the drug is mixed with a wax material and either spray-congealed or congealed and screened and processed.

ii. Delayed Release Dosage Forms

Delayed release formulations can be created by coating a solid dosage form with a polymer film, which is insoluble in the acidic environment of the stomach, and soluble in the neutral environment of the small intestine.

The delayed release dosage units can be prepared, for example, by coating a drug or a drug-containing composition with a selected coating material. The drug-containing composition may be, e.g., a tablet for incorporation into a capsule, a tablet for use as an inner core in a "coated core" dosage form, or a plurality of drug-containing beads, particles or granules, for incorporation into either a tablet or capsule. Preferred coating materials include bioerodible, gradually hydrolyzable, gradually water-soluble, and/or enzymatically degradable polymers, and may be conventional "enteric" polymers. Enteric polymers, as will be appreciated by those skilled in the art, become soluble in the higher pH environment of the lower gastrointestinal tract or slowly erode as the dosage form passes through the gastrointestinal tract, while enzymatically degradable polymers are degraded by bacterial enzymes present in the lower gastrointestinal tract, particularly in the colon. Suitable coating materials for effecting delayed release include, but are not limited to, cellulosic polymers such as hydroxypropyl cellulose, hydroxyethyl cellulose, hydroxymethyl cellulose, hydroxypropyl methyl cellulose, hydroxypropyl methyl cellulose acetate succinate, hydroxypropylmethyl cellulose phthalate, methylcellulose, ethyl cellulose, cellulose acetate, cellulose acetate phthalate, cellulose acetate trimellitate and carboxymethylcellulose sodium; acrylic acid polymers and copolymers, preferably formed from acrylic acid, methacrylic acid, methyl acrylate, ethyl acrylate, methyl methacrylate and/or ethyl methacrylate, and other methacrylic resins that are commercially available under the tradename Eudragit® (Rohm Pharma; Westerstadt, Germany), including EUDRAGIT® L30D-55 and L100-55 (soluble at pH 5.5 and above), EUDRAGIT® L-100 (soluble at pH 6.0 and above), EUDRAGIT® S (soluble at pH 7.0 and above, as a result of a higher degree of esterification), and EUDRAGITS® NE, RL and RS (water-insoluble polymers having different degrees of permeability and expandability); vinyl polymers and copolymers such as polyvinyl pyrrolidone, vinyl acetate, vinylacetate phthalate, vinylacetate crotonic acid copolymer, and ethylene-vinyl acetate copolymer; enzymatically degradable polymers such as azo polymers, pectin, chitosan, amylose and guar gum; zein and shellac. Combinations of different coating materials may also be used. Multi-layer coatings using different polymers may also be applied.

The preferred coating weights for particular coating materials may be readily determined by those skilled in the art by evaluating individual release profiles for tablets, beads and granules prepared with different quantities of various coating materials. It is the combination of materials, method and form of application that produce the desired release characteristics, which one can determine only from the clinical studies.

The coating composition may include conventional additives, such as plasticizers, pigments, colorants, stabilizing agents, glidants, etc. A plasticizer is normally present to reduce the fragility of the coating, and will generally represent about 10 wt. % to 50 wt. % relative to the dry weight of the polymer. Examples of typical plasticizers include polyethylene glycol, propylene glycol, triacetin, dimethyl phthalate, diethyl phthalate, dibutyl phthalate, dibutyl sebacate, triethyl citrate, tributyl citrate, triethyl acetyl citrate, castor oil and acetylated monoglycerides. A stabilizing agent is preferably used to stabilize particles in the dispersion. Typical stabilizing agents are nonionic emulsifiers such as sorbitan esters, polysorbates and polyvinylpyrrolidone. Glidants are recommended to reduce sticking effects during film formation and drying, and will generally represent approximately 25 wt. % to 100 wt. % of the polymer weight in the coating solution. One effective glidant is talc. Other glidants such as magnesium stearate and glycerol monostearates may also be used. Pigments such as titanium dioxide may also be used. Small quantities of an anti-foaming agent, such as a silicone (e.g., simethicone), may also be added to the coating composition.

2. Parenteral Formulations

The compounds described herein can be formulated for parenteral administration. For example, parenteral administration may include administration to a patient intravenously, intradermally, intraarterially, intraperitoneally, intralesionally, intracranially, intraarticularly, intraprostatically, intrapleurally, intratracheally, intravitreally, intratumorally, intramuscularly, subcutaneously, subconjunctivally, intravesicularly, intrapericardially, intraumbilically, by injection, and by infusion.

In particularly preferred embodiments, the parenteral administration is formulated for liver targeting. Methods for targeting nanoparticles to the liver using galactosylated or mannosylated lipids are known (reviewed in Gorad, et al., International Journal Of Pharmaceutical Sciences And Research, 4(11):4145-4157 (2013). For examples, targeting to the asialoglycoprotein receptor (ASGP-R) is the most universally employed method to enhance clathrin mediated endocytotic uptake of nanoparticle therapeutics by hepatocytes. This approach takes advantage of the innate binding affinity of the ASGP-R to a broad range of molecules exposing galactose and N-acetyl-galactosamine residues, such as asialoorosomucoid, asialofetuin (AF), sterylglucoside, lactose and poly-(N-ρ-vinylbenzyl-O-β-Dgalactopyranosyl-[1-4]-D-glucosamine (PVLA) for target in to hepatocytes. Zhou, et al., *International Journal of Pharmaceutics*, 478(2), 633-643 (2015) discloses lactosylated PLGA nanoparticles containing ε-polylysine for the sustained release and liver-targeted delivery. Targeted delivery of drug to hepatic can be successfully achieved by binding to asialoglycoprotien receptor which is present in liver cells. Venugapol, et al. *Albanian J. Pharmaceutical Sci.* 2(1):1-3 (2014) describe galacto-sylated chitosan nanoparticles for targeted drug delivery to the liver. A liver-targeted drug delivery system using gold nanoparticles is disclosed in WO 201317468.

Parenteral formulations can be prepared as aqueous compositions using techniques known in the art. Typically, such compositions can be prepared as injectable formulations, for example, solutions or suspensions; solid forms suitable for using to prepare solutions or suspensions upon the addition of a reconstitution medium prior to injection; emulsions, such as water-in-oil (w/o) emulsions, oil-in-water (o/w) emulsions, and microemulsions thereof, liposomes, or emulsomes.

The carrier can be a solvent or dispersion medium containing, for example, water, ethanol, one or more polyols (e.g., glycerol, propylene glycol, and liquid polyethylene glycol), oils, such as vegetable oils (e.g., peanut oil, corn oil, sesame oil, etc.), and combinations thereof. The proper fluidity can be maintained, for example, by the use of a coating, such as lecithin, by the maintenance of the required particle size in the case of dispersion and/or by the use of surfactants. In many cases, it will be preferable to include isotonic agents, for example, sugars or sodium chloride.

Solutions and dispersions of the active compounds as the free acid or base or pharmacologically acceptable salts thereof can be prepared in water or another solvent or dispersing medium suitably mixed with one or more pharmaceutically acceptable excipients including, but not limited to, surfactants, dispersants, emulsifiers, pH modifying agents, viscosity modifying agents, and combination thereof.

Suitable surfactants may be anionic, cationic, amphoteric or nonionic surface-active agents. Suitable anionic surfactants include, but are not limited to, those containing carboxylate, sulfonate and sulfate ions. Examples of anionic surfactants include sodium, potassium, ammonium of long chain alkyl sulfonates and alkyl aryl sulfonates such as sodium dodecylbenzene sulfonate; dialkyl sodium sulfosuccinates, such as sodium dodecylbenzene sulfonate; dialkyl sodium sulfosuccinates, such as sodium bis-(2-ethylthioxyl)-sulfosuccinate; and alkyl sulfates such as sodium lauryl sulfate. Cationic surfactants include, but are not limited to, quaternary ammonium compounds such as benzalkonium chloride, benzethonium chloride, cetrimonium bromide, stearyl dimethylbenzyl ammonium chloride, polyoxyethylene and coconut amine Examples of nonionic surfactants include ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene monolaurate, polysorbates, polyoxyethylene octylphenylether, PEG-1000 cetyl ether, polyoxyethylene tridecyl ether, polypropylene glycol butyl ether, Poloxamer® 401, stearoyl monoisopropanolamide, and polyoxyethylene hydrogenated tallow amide. Examples of amphoteric surfactants include sodium N-dodecyl-.beta.-alanine, sodium N-lauryl-.beta.-iminodipropionate, myristoamphoacetate, lauryl betaine and lauryl sulfobetaine.

The formulation can contain a preservative to prevent the growth of microorganisms. Suitable preservatives include, but are not limited to, parabens, chlorobutanol, phenol, sorbic acid, and thimerosal. The formulation may also contain an antioxidant to prevent degradation of the active agent(s).

The formulation is typically buffered to a pH of 3-8 for parenteral administration upon reconstitution. Suitable buffers include, but are not limited to, phosphate buffers, acetate buffers, and citrate buffers.

Water-soluble polymers are often used in formulations for parenteral administration. Suitable water-soluble polymers include, but are not limited to, polyvinylpyrrolidone, dextran, carboxymethylcellulose, and polyethylene glycol.

Sterile injectable solutions can be prepared by incorporating the active compounds in the required amount in the appropriate solvent or dispersion medium with one or more of the excipients listed above, as required, followed by filtered sterilization. Generally, dispersions are prepared by incorporating the various sterilized active ingredients into a sterile vehicle which contains the basic dispersion medium and the required other ingredients from those listed above. In the case of sterile powders for the preparation of sterile injectable solutions, the preferred methods of preparation are acuum-drying and freeze-drying techniques which yield a powder of the active ingredient plus any additional desired ingredient from a previously sterile-filtered solution thereof. The powders can be prepared in such a manner that the particles are porous in nature, which can increase dissolution of the particles. Methods for making porous particles are well known in the art.

a. Controlled Release Formulations

The parenteral formulations described herein can be formulated for controlled release including immediate release, delayed release, extended release, pulsatile release, and combinations thereof.

i. Nano- and Microparticles

For parenteral administration, the one or more compounds, and optional one or more additional active agents, can be incorporated into microparticles, nanoparticles, or combinations thereof that provide controlled release of the compounds and/or one or more additional active agents. In embodiments wherein the formulations contains two or more drugs, the drugs can be formulated for the same type of controlled release (e.g., delayed, extended, immediate, or pulsatile) or the drugs can be independently formulated for different types of release (e.g., immediate and delayed, immediate and extended, delayed and extended, delayed and pulsatile, etc.). For example, the compounds and/or one or more additional active agents can be incorporated into polymeric microparticles, which provide controlled release of the drug(s). Release of the drug(s) is controlled y diffusion of the drug(s) out of the microparticles and/or degradation of the polymeric particles by hydrolysis and/or enzymatic degradation. Suitable polymers include ethylcellulose and other natural or synthetic cellulose derivatives.

Polymers, which are slowly soluble and form a gel in an aqueous environment, such as hydroxypropyl methylcellulose or polyethylene oxide, can also be suitable as materials for drug containing microparticles. Other polymers include, but are not limited to, polyanhydrides, poly(ester anhydrides), polyhydroxy acids, such as polylactide (PLA), polyglycolide (PGA), poly(lactide-co-glycolide) (PLGA), poly-3-hydroxybutyrate (PHB) and copolymers thereof, poly-4-hydroxybutyrate (P4HB) and copolymers thereof, polycaprolactone and copolymers thereof, and combinations thereof.

Alternatively, the TLR5 agonists can be incorporated into microparticles prepared from materials which are insoluble in aqueous solution or slowly soluble in aqueous solution, but are capable of degrading within the GI tract by means including enzymatic degradation, surfactant action of bile acids, and/or mechanical erosion. As used herein, the term "slowly soluble in water" refers to materials that are not dissolved in water within a period of 30 minutes. Preferred examples include fats, fatty substances, waxes, wax-like substances and mixtures thereof. Suitable fats and fatty substances include fatty alcohols (such as lauryl, myristyl stearyl, cetyl or cetostearyl alcohol), fatty acids and derivatives, including but not limited to fatty acid esters, fatty acid glycerides (mono-, di- and tri-glycerides), and hydrogenated fats. Specific examples include, but are not limited to hydrogenated vegetable oil, hydrogenated cottonseed oil, hydrogenated castor oil, hydrogenated oils available under the trade name Sterotex®, stearic acid, cocoa butter, and stearyl alcohol. Suitable waxes and wax-like materials include natural or synthetic waxes, hydrocarbons, and normal waxes. Specific examples of waxes include beeswax, glycowax, castor wax, carnauba wax, paraffins and candelilla wax. As used herein, a wax-like material is defined as any material, which is normally solid at room temperature and has a melting point of from about 30 to 300° C. In some cases, it may be desirable to alter the rate of water penetration into the microparticles. To this end, rate-controlling (wicking) agents can be formulated along with the fats or waxes listed above. Examples of rate-controlling materials include certain starch derivatives e.g., waxy maltodextrin and drum dried corn starch), cellulose derivatives (e.g., hydroxypropylmethyl-cellulose, hydroxypropylcellulose, methylcellulose, and carboxymethyl-cellulose), alginic acid, lactose and talc. Additionally, a pharmaceutically acceptable surfactant (for example, lecithin) may be added to facilitate the degradation of such microparticles.

Proteins, which are water insoluble, such as zein, can also be used as materials for the formation of drug containing microparticles. Additionally, proteins, polysaccharides and combinations thereof, which are water-soluble, can be formulated with drug into microparticles and subsequently cross-linked to form an insoluble network. For example, cyclodextrins can be complexed with individual drug molecules and subsequently cross-linked.

ii. Method of Making Nano- and Microparticles

Encapsulation or incorporation of drug into carrier materials to produce drug-containing microparticles can be achieved through known pharmaceutical formulation techniques. In the case of formulation in fats, waxes or wax-like materials, the carrier material is typically heated above its melting temperature and the drug is added to form a mixture comprising drug particles suspended in the carrier material, drug dissolved in the carrier material, or a mixture thereof. Microparticles can be subsequently formulated through several methods including, but not limited to, the processes of congealing, extrusion, spray chilling or aqueous dispersion. In a preferred process, wax is heated above its melting temperature, drug is added, and the molten wax-drug mixture is congealed under constant stirring as the mixture cools. Alternatively, the molten wax-drug mixture can be extruded and spheronized to form pellets or beads. These processes are known in the art.

For some carrier materials it may be desirable to use a solvent evaporation technique to produce drug-containing microparticles. In this case drug and carrier material are co-dissolved in a mutual solvent and microparticles can subsequently be produced by several techniques including, but not limited to, forming an emulsion in water or other appropriate media, spray drying or by evaporating off the solvent from the bulk solution and milling the resulting material.

In some embodiments, drug in a particulate form is homogeneously dispersed in a water-insoluble or slowly water soluble material. To minimize the size of the drug particles within the composition, the drug powder itself may be milled to generate fine particles prior to formulation. The process of jet milling, known in the pharmaceutical art, can be used for this purpose. In some embodiments drug in a particulate form is homogeneously dispersed in a wax or wax like substance by heating the wax or wax like substance above its melting point and adding the drug particles while stirring the mixture. In this case a pharmaceutically acceptable surfactant may be added to the mixture to facilitate the dispersion of the drug particles.

The particles can also be coated with one or more modified release coatings. Solid esters of fatty acids, which are hydrolyzed by lipases, can be spray coated onto microparticles or drug particles. Zein is an example of a naturally water-insoluble protein. It can be coated onto rug containing microparticles or drug particles by spray coating or by wet granulation techniques. In addition to naturally water-insoluble materials, some substrates of digestive enzymes can be treated with cross-linking procedures, resulting in the formation of non-soluble networks. Many methods of cross-linking proteins, initiated by both chemical and physical means, have been reported. One of the most common methods to obtain cross-linking is the use of chemical cross-linking agents. Examples of chemical cross-linking agents include aldehydes (gluteraldehyde and formaldehyde), epoxy compounds, carbodiimides, and genipin. In addition to these cross-linking agents, oxidized and native sugars have been used to cross-link gelatin. Cross-linking can also be accomplished using enzymatic means; for example, transglutaminase has been approved as a GRAS substance for cross-linking seafood products. Finally, cross-linking can be initiated by physical means such as thermal treatment, UV irradiation and gamma irradiation.

To produce a coating layer of cross-linked protein surrounding drug containing microparticles or drug particles, a water-soluble protein can be spray coated onto the microparticles and subsequently cross-linked by the one of the methods described above. Alternatively, drug-containing microparticles can be microencapsulated within protein by coacervation-phase separation (for example, by the addition of salts) and subsequently cross-linked. Some suitable proteins for this purpose include gelatin, albumin, casein, and gluten.

Polysaccharides can also be cross-linked to form a water-insoluble network. For many polysaccharides, this can be accomplished by reaction with calcium salts or multivalent cations, which cross-link the main polymer chains. Pectin, alginate, dextran, amylose and guar gum are subject to cross-linking in the presence of multivalent cations. Complexes between oppositely charged polysaccharides can also be formed; pectin and chitosan, for example, can be complexed via electrostatic interactions.

3. Injectable/Implantable Formulations

The agonists described herein can be incorporated into injectable/implantable solid or semi-solid implants, such as polymeric implants. In one embodiment, the compounds are incorporated into a polymer that is a liquid or paste at room temperature, but upon contact with aqueous medium, such as physiological fluids, exhibits an increase in viscosity to form a semi-solid or solid material. Exemplary polymers include, but are not limited to, hydroxyalkanoic acid polyesters derived from the copolymerization of at least one unsaturated hydroxy fatty acid copolymerized with hydroxyalkanoic acids. The polymer can be melted, mixed with the active substance and cast or injection molded into a device. Such melt fabrication require polymers having a melting point that is below the temperature at which the substance to be delivered and polymer degrade or become reactive. The device can also be prepared by solvent casting where the polymer is dissolved in a solvent and the drug dissolved or dispersed in the polymer solution and the solvent is then evaporated. Solvent processes require that the polymer be soluble in organic solvents. Another method is compression molding of a mixed powder of the polymer and the drug or polymer particles loaded with the active agent. Alternatively, the compounds can be incorporated into a polymer matrix and molded, compressed, or extruded into a device that is a solid at room temperature. For example, the compounds can be incorporated into a biodegradable polymer, such as polyanhydrides, polyhydroalkanoic acids (PHAs), PLA, PGA, PLGA, polycaprolactone, polyesters, polyamides, polyorthoesters, polyphosphazenes, proteins and polysaccharides such as collagen, hyaluronic acid, albumin and gelatin, and combinations thereof and compressed into solid device, such as disks, or extruded into a device, such as rods.

The release of the one or more compounds from the implant can be varied by selection of the polymer, the molecular weight of the polymer, and/or modification of the polymer to increase degradation, such as the formation of pores and/or incorporation of hydrolyzable linkages. Methods for modifying the properties of biodegradable polymers to vary the release profile of the compounds from the implant are well known in the art.

III. Method of Making

In addition to methods of making disclosed above, encapsulation of labile biologics into biodegradable polymers provides protection from the acidic environment and the proteases of the stomach and allows safe passage into the lumen of the GI tract for uptake (Yamanaka, et al., *J. Biomater. Sci. Polym Ed*, 19:1549-70 (2008). Until recently, this technology primarily targeted small molecule drugs and peptides because larger bioactive macromolecules are generally more highly sensitive to organic solvents and mechanical agitation techniques that are used during encapsulation. PIN® technology has now made it possible to encapsulate such biologically active macromolecules into biodegradable polymer microspheres while preserving biological activity (Chung, et al., *Cancer Res.*, 74(19):5377-5385 (2014). Three different strategies to locally deliver biopharmaceutical drugs to the gut using oral administration of nanoparticles have recently been compared (Coco, et a., *Int. J. Phar.*, 440:3-12 (2013). PLGA-PEG-mannose nanoparticles achieved highest accumulation in target tissue.

A. Spray Drying

Methods for forming microspheres/nanospheres using spray drying techniques are described in U.S. Pat. No. 6,620,617, to Mathiowitz et al. In this method, the polymer is dissolved in an organic solvent such as methylene chloride or in water. A known amount of one or more active agents to be incorporated in the particles is suspended (in the case of an insoluble active agent) or co-dissolved (in the case of a soluble active agent) in the polymer solution. The solution or dispersion is pumped through a micronizing nozzle driven by a flow of compressed gas, and the resulting aerosol is suspended in a heated cyclone of air, allowing the solvent to evaporate from the microdroplets, forming particles.

Microspheres/nanospheres ranging between 0.1-10 microns can be obtained using this method.

B. Interfacial Polymerization

Interfacial polymerization can also be used to encapsulate one or more active agents. Using this method, a monomer and the active agent(s) are dissolved in a solvent. A second monomer is dissolved in a second solvent (typically aqueous) which is immiscible with the first. An emulsion is formed by suspending the first solution through stirring in the second solution. Once the emulsion is stabilized, an initiator is added to the aqueous phase causing interfacial polymerization at the interface of each droplet of emulsion.

C. Phase Separation Microencapsulation

In phase separation microencapsulation techniques, a polymer solution is stirred, optionally in the presence of one or more active agents to be encapsulated. While continuing to uniformly suspend the material through stirring, a nonsolvent for the polymer is slowly added to the solution to decrease the polymer's solubility. Depending on the solubility of the polymer in the solvent and nonsolvent, the polymer either precipitates or phase separates into a polymer rich and a polymer poor phase. Under proper conditions, the polymer in the polymer rich phase will migrate to the interface with the continuous phase, encapsulating the active agent(s) in a droplet with an outer polymer shell.

1. Spontaneous Emulsion Microencapsulation

Spontaneous emulsification involves solidifying emulsified liquid polymer droplets formed above by changing temperature, evaporating solvent, or adding chemical cross-linking agents. The physical and chemical properties of the encapsulant, as well as the properties of the one or more active agents optionally incorporated into the nascent particles, dictates suitable methods of encapsulation. Factors such as hydrophobicity, molecular weight, chemical stability, and thermal stability affect encapsulation.

2. Solvent Evaporation Microencapsulation

Methods for forming microspheres using solvent evaporation techniques are described in E. Mathiowitz et al., *J. Scanning Microscopy*, 4:329 (1990); L. R. Beck et al., *Fertil. Steril.*, 31:545 (1979); L. R. Beck et al *Am J Obstet Gynecol* 135(3) (1979); S. Benita et al., *J. Pharm. Sci.*, 73:1721 (1984); and U.S. Pat. No. 3,960,757 to Morishita et al. The polymer is dissolved in a volatile organic solvent, such as methylene chloride. One or more active agents to be incorporated are optionally added to the solution, and the mixture is suspended in an aqueous solution that contains a surface active agent such as poly(vinyl alcohol). The resulting emulsion is stirred until most of the organic solvent evaporated, leaving solid microspheres/nanospheres. This method is useful for relatively stable polymers like polyesters and polystyrene. However, labile polymers, such as polyanhydrides, may degrade during the fabrication process due to the presence of water. For these polymers, some of the following methods performed in completely anhydrous organic solvents are more useful.

3. Coacervation

Procedures for encapsulation using coacervation techniques are known in the art, for example, in GB-B-929 406; GB-B-929 40 1; and U.S. Pat. Nos. 3,266,987, 4,794,000, and 4,460,563. Coacervation involves the separation of a macromolecular solution into two immiscible liquid phases. One phase is a dense coacervate phase, which contains a high concentration of the polymer encapsulant (and optionally one or more active agents), while the second phase contains a low concentration of the polymer. Within the dense coacervate phase, the polymer encapsulant forms nanoscale or microscale droplets. Coacervation may be induced by different methods including a temperature change, addition of a non-solvent or addition of a micro-salt (simple coacervation), or by the addition of another polymer thereby forming an interpolymer complex (complex coacervation).

The amount of microgels needed to deliver a pharmaceutically effective dosage of insulin in a patient will vary based on such factors including but not limited to, the crosslinker and polymerizing group chosen, the protein loading capacity and efficiency of the gel particles, the toxicity levels of the biodegraded particles, the amount and type of bioactive material needed to effect the desired response, the subject's species, age, weight, and condition, the disease and its severity, the mode of administration, and the like. One skilled in the art would be able to determine the pharmaceutically effective dosage.

4. Phase Inversion Nano-Encapsulation (PIN®)

Phase Inversion Nano-encapsulation (PIN®) utilizes a non-mechanical microsphere encapsulation approach that preserves the structural integrity of macromolecules. PIN® allows the production of microspheres with an average size of 0.1-5 microns, ideally suited for oral delivery of agents to the gut, as particles smaller than 5 um in diameter readily traverse the GI barrier (Florence, et al., *Pharm. Res.*, 14(3): 259-266 (1997); Ermak, et al., Cell and Tissue Res., 279 (2):433-436 (1995); Jani, et al., *J. Pharm. Pharmacol.*, 41(12):809-812 (1989)). Orally administered PIN® microspheres are efficiently taken up in Peyer's patches and mesenteric lymph nodes (Chung, et al., Cancer Res., 74(19): 5377-5385 (2014).

With respect to orally delivering nucleotides, U.S. Pat. No. 9,666,910 discloses an oral nucleic acid delivery system having liver-specificity and improved stability of nucleic acid molecules inside a living organism by using gold nanoparticles, glycol chitosan, and taurocholic acid. U.S. Pat. No. 6,110,456 describes a method of expressing a gene product in the gut of an animal by oral delivery.

IV. Methods of Using

The disclosed methods use direct stimulation of the endogenous production of apolipoprotein-A1 by TLR5 agonist as an effective way to stimulate HDL production and prevent/ameliorate one or more symptoms in a subject in need thereof. Accordingly, the compositions can be used to increase endogenous ApoA1 and/or HDL levels in a subject in need thereof. In one preferred embodiment, the subject is diagnosed with atherosclerosis. Atherosclerosis is a narrowing of the arteries caused by a buildup of plaque. It's also called arteriosclerosis or hardening of the arteries. Key components of the pathology of atherosclerosis are: elevation of the levels of cholesterol within the circulating blood; excessive entry of cholesterol into the intimal lining of small arteries; inadequate extrusion of cholesterol from arterial cells back into the plasma; the intracellular response to cholesterol accumulation with the development of plaque, vascular thickening and fibrosis, and ulceration; progressive narrowing and eventual occlusion of small arteries causing reduction and cessation of blood flow and interaction between blood platelets and damaged arterial cells that initiates intravascular thrombosis and embolism with ischaemic damage to target organs The disclosed compositions can also be used to treat subjects with hypercholesterolemia or hyperlipidemia or at risk of developing coronary heart disease. A number of conditions can increase cholesterol levels including diabetes mellitus type 2, obesity, alcohol use, monoclonal gammopathy, dialysis, nephrotic syndrome, hypothyroidism, Cushing's syndrome, anorexia nervosa, medications (e.g., thiazide diuretics, ciclosporin, glucocorticoids, beta blockers, retinoic acid, antipsychotics). In the United States, the National Heart, Lung, and Blood Institute within the National Institutes of Health classifies total cholesterol of less than 200 mg/dL as "desirable," 200 to 239 mg/dL as "borderline high," and 240 mg/dL or more as "high".

The compositions can also be administered to subjects that have at least one risk factor for coronary heart disease, are between 40 and 75 years old, have at least a 10% 10-year risk of heart disease, or a combination thereof.

It is within the abilities of a treating physician to determine therapeutic intervention based on lipid and/cholesterol levels. A review of the recent update to the U.S. cholesterol treatment guidelines compared to international guidelines is provided by Nayor, et al. *Circulation*, 133(18):1795-806 (2016).

The risk factors for coronary heart disease included abnormal lipid levels in the blood, diabetes mellitus, high blood pressure, and smoking. Bibbins-Diningo, et al., *JAMA*, 2016 Nov. 15; 316(19):1997-2007. The risk of heart disease can be estimated using the ACC/AHA Pooled Cohort equation. A Report of the American College of Cardiology/American Heart Association Task Force on Practice Guidelines is published. See Goff D C Jr, et al. 2013 ACC/AHA Cardiovascular Risk Guideline. The Amercian Association of Clinical Endocrinologists published AACE 2017 Guideline, a clinical practice guideline (CPG) is for the diagnosis and treatment of dyslipidemia and prevention of cardiovascular disease. The mandate for this CPG is to provide a practical guide for endocrinologists to reduce the risks and consequences of dyslipidemia. This CPG extends and updates existing CPGs available in the literature, such as the American Association of Clinical Endocrinologists (AACE) Medical Guidelines for Clinical Practice for the Diagnosis and Treatment of Dyslipidemia and Prevention of Atherosclerosis and complements the AACE Diabetes Mellitus Comprehensive Care Plan CPG. The landmark National Cholesterol Education Program (NCEP) guidelines serve as the backbone of the lipid recommendations. This CPG is unique in that it supports the use of apoli-poprotein (apo) B level and/or LDL particle concentration to refine efforts to achieve effective LDL-C lowering, provides screening recommendations for individuals of different ages, and identifies special issues for children and adolescents. This CPG also discusses the challenges associated with atherosclerosis and heart disease that are specific to women.

An exemplary set of guidelines is provided below in Table 1 put for the by the Mayo Clinic.

TABLE 1

Cholesterol General Guidelines

| Total cholesterol (U.S. and some other countries) | Total cholesterol* (Canada and most of Europe) |
|---|---|
| Below 200 mg/dL | Below 5.2 mmol/L Desirable |
| 200-239 mg/dL | 5.2-6.2 mmol/L Borderline high |
| 240 mg/dL and above | Above 6.2 mmol/L High |

| LDL cholesterol (U.S. and some other countries) | LDL cholesterol* (Canada and most of Europe) |
|---|---|
| Below 70 mg/dL | Below 1.8 mmol/L Best for people who have heart disease or diabetes. |
| Below 100 mg/dL | Below 2.6 mmol/L Optimal for people at risk of heart disease. |
| 100-129 mg/dL | 2.6-3.3 mmol/L Near optimal if there is no heart disease. High if there is heart disease. |
| 130-159 mg/dL | 3.4-4.1 mmol/L Borderline high if there is no heart disease. High if there is heart disease. |
| 160-189 mg/dL | 4.1-4.9 mmol/L High if there is no heart disease. Very high if there is heart disease. |
| 190 mg/dL and above | Above 4.9 mmol/L Very high. |

| HDL cholesterol (U.S. and some other countries) | HDL cholesterol* (Canada and most of Europe) |
|---|---|
| Below 40 mg/dL | Below 1 mmol/L Poor |
| 40-59 mg/dL | 1-1.5 mmol/L Better |
| 60 mg/dL and above | Above 1.5 mmol/L Best |

| Triglycerides (U.S. and some other countries) | Triglycerides* (Canada and most of Europe) |
|---|---|

*Canadian and European guidelines differ slightly from U.S. guidelines. These conversions are based on U.S. guidelines.

EXAMPLES

Example 1: Treatment with Flagellin Stimulates the Production of Apoa1

The disclosed compositions and methods are based on the observation that flagellated bacteria in the gut increases upon high-fat diet. These bacteria produce flagellin which is a TLR5 agonist. Flagellin is absorbed and reached the liver through the portal vein system.

Six-week old wild type mice were fed a normal chow diet (NCD) or high fat diet (HFD, 45% fat kcal) for 10 weeks, HDL was measured in the serum using Stanbio™ HDL-Cholesterol Liquid Reagent, and liver was collected for evaluation of flagellin levels (flagellin travels to the intestine from the liverby Western immunoblotting. (n=10, *p<0.05, **p<0.01).

Figure 2A:
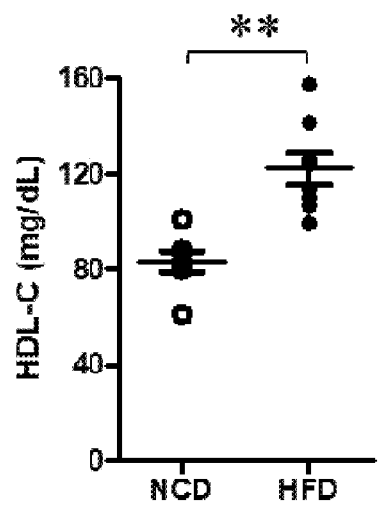
FIGS. 2A-2B are graphs showing the effect of a high fat diet (HFD) on the levels of circulating HDL-C (mg/dL) (2C) and levels of flagellin in the liver (Liver Fla2:beta-actin ratio) (2D) in mice. HFD increased circulating HDL-C levels and flagellin level in the liver when compared to a normal chow diet (NCD).
Figure 2B:
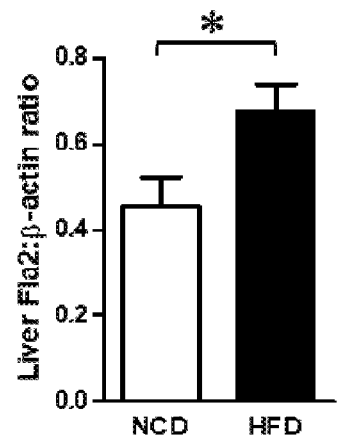

HFD increased HDL-C levels in serum when compared to NCD (FIG. 2A). Animals fed on a HFD also showed a significant increase in flagellin levels in the liver.

In some experiments, six-week old wild type mice and TLR5 knockout (TSKO) mice were fed a high fat diet (HFD, 45% fat kcal) for 10 weeks. HDL and apoA1 was measured in the serum using Stanbio™ HDL-Cholesterol Liquid Reagent and Western immunblotting, respectively. (n=10, *p<0.05, **p<0.01).

Figure 2C:
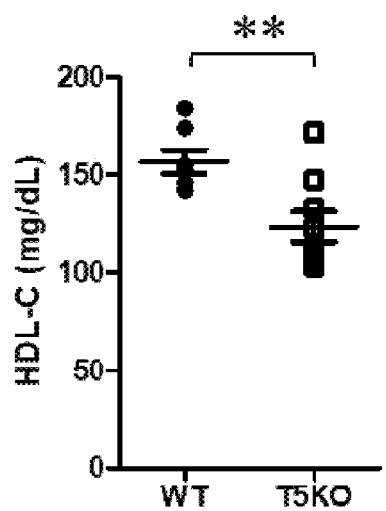
FIGS. 2C-2D are graphs showing that deletion of TLR5 (mice genetically deficient in TLR5 (TSKO)), the receptor for flagellin, decreased HDL-C (mg/dL) (2C) and apoA1 levels (ApoA1:IgG ratio) (2D) in circulation in TSKO when compared to wild type mice.
Figure 2D:
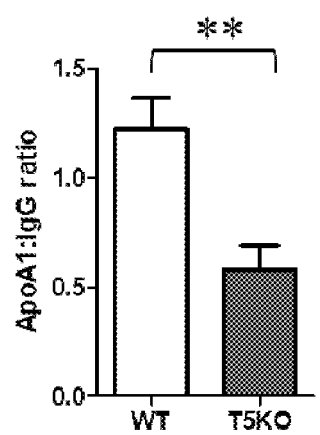

Genetic deletion of TLR5 (TSKO) suppressed apoA1 production in mice and decreased HDL-C level in circulation (FIG. 2C)

Figure 3A:
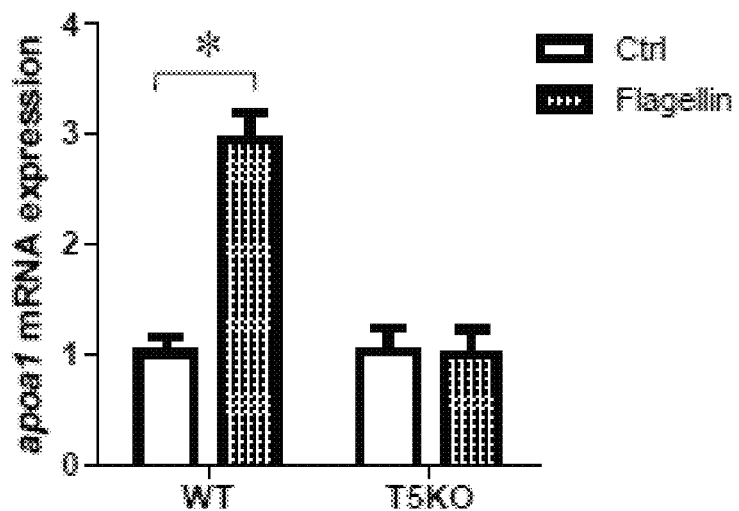
FIGS. 3A-3D are bar graphs showing flagellin treatment stimulated apoA1 expression in primary hepatocytes in TLR5-dependent manner
Figure 3B:
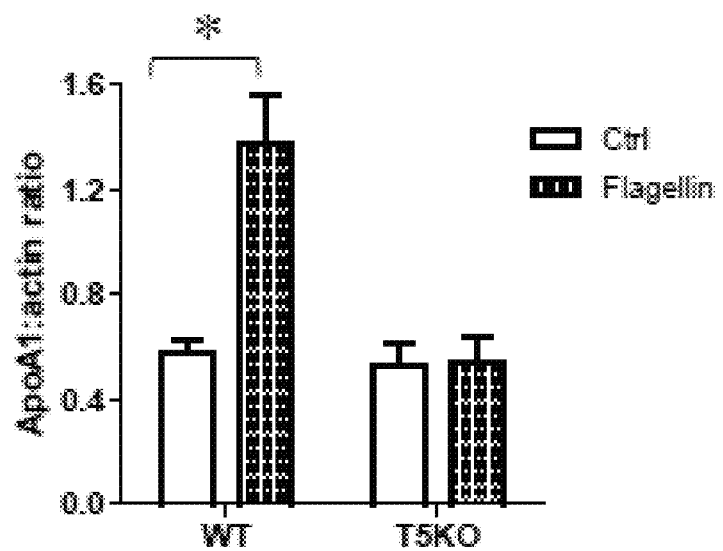

Primary hepatocytes were isolated from WT and TSKO mice, followed by the treatment with flagellin (100 ng/mL) for 8 hours. ApoA1 mRNA (FIG. 3A and protein (FIG. 3B) were determined by real-time PCR and Western immunoblotting, respectively. (n=3 independent experiments, *p<0.05).

Human hepatocytes, HepG2, were transfected with GFP or TLR5 plasmid followed by with flagellin treatment (100 ng/mL) for 8 hours. ApoA1 mRNA (FIG. 3C) and protein (FIG. 3D) were determined. (n=3 independent experiments, *p<0.05). Studies by Nishimura, et al., *Biol. Pharm. Bull.*, 28(5):886-892 (2005) discloses that HepG2 cells show no or very weak expression of TLR1, TLR4, TLR5, TLR7, TLR5, and TLR10. Nishimura, et al., *Biol. Pharm. Bull.*, 28(5):886-892 (2005) demonstrated mRNA expression of 10 toll-like cells including TLR5 in all human tissues tested, including liver.

Treatment with flagellin in hepatocytes directly stimulated the production of apoA1. In primary hepatocyte cells isolated from wildtype mice, flagellin treatment (flagellin dissolved in water significantly increased apoA1 mRNA (FIG. 3A) and protein levels (FIG. 3B) when compared to control (water). By contrast, flagellin treatment had no effect on apoA1 expression when TLR5 was absent. No difference was observed in apoA1 mRNA and protein levels in primary hepatocyte cells isolated from T5 K0 mice treated with flagellin, compared to control.

Figure 3C:
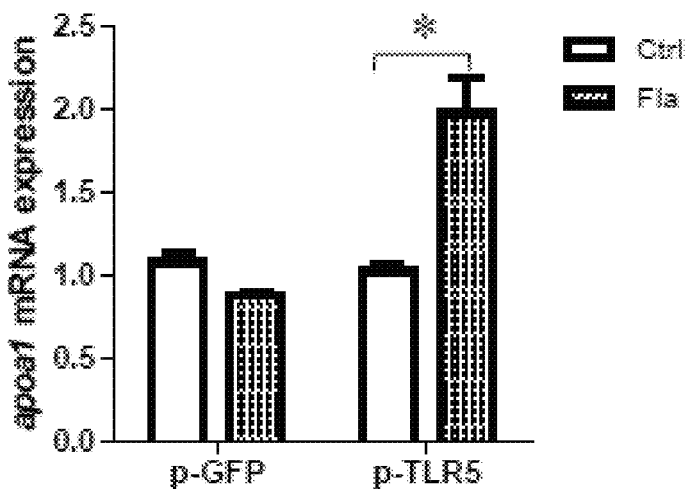
Figure 3D:
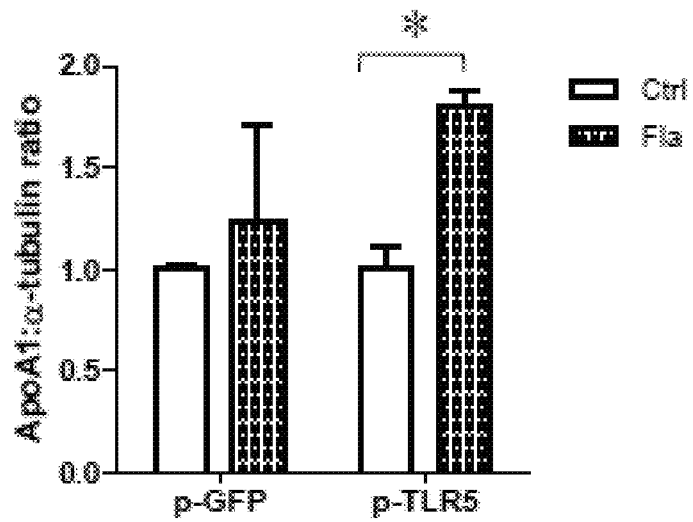

Human hepatocytes (HepG2) transfected with GFP show decreased apoA1 mRNA levels and protein levels when compared to HepG2 cells transfected with TLR5. HepG2 cells transfected with GFP do not show any increase in apoA1 mRNA or protein levels in response to flagellin treatment, when compared to control. Specific expression of TLR5 results in a significant increases in apoA1 mRNA and protein levels in HepG2 cells in response to flagellin treatment. FIGS. 3C and 3D.

Figure 3E:
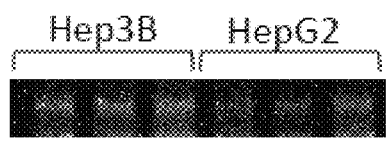
FIGS. 3E and 3F show PCR amplification (FIG. 3E) and real-time PCR (FIG. 3F) following RNA isolation from Hep3B and HepG2 cells.
Figure 3F:
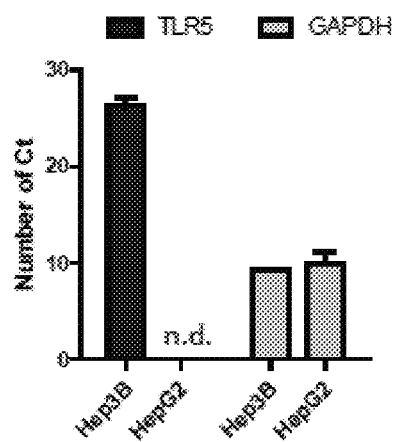

HepG2 cells have a rearrangement of chromosome 1 where the TLR5 gene is found. PCR analysis was performed on Hep3B and HEpG2 cells. Hep3B and HepG2 cells were harvested for total RNA isolation, followed by reverse transcription and (A) PCR amplification, and (B) real-time PCR for detection of TLR5. The data showed an absence of TLR5 in HepG2 cells. FIGS. 3E and 3F. Thus, specific expression of TLR5 in liver restored the suppressed apoA1 and HDL levels in the genetic deletion model. FIG. 3A-3D.

Example 2: Oral Administration of Flagellin Increases HDL Level

Figure 4A:
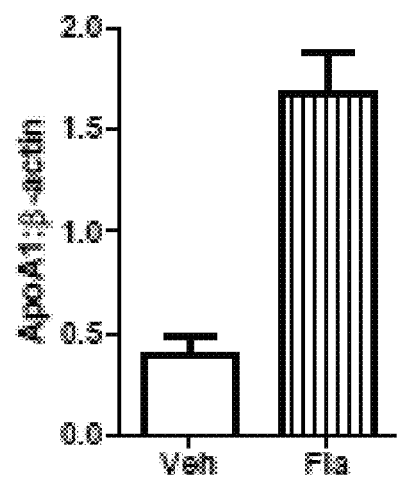
FIGS. 4A-4C are graphs showing that oral supplementation of flagellin increased apoA1 in liver, and apoA1 and HDL in circulation of atherogenic apoE-deficient mice.
Figure 4B:
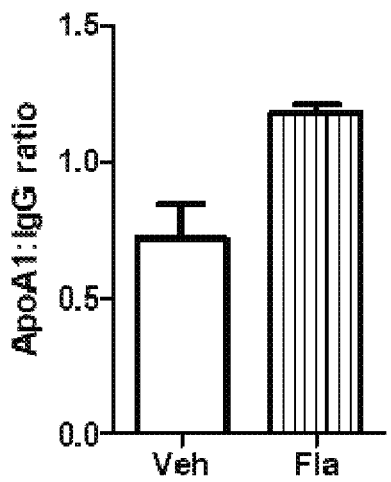
Figure 4C:
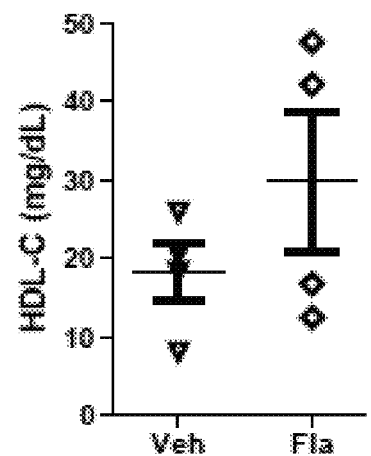
Figure 5:
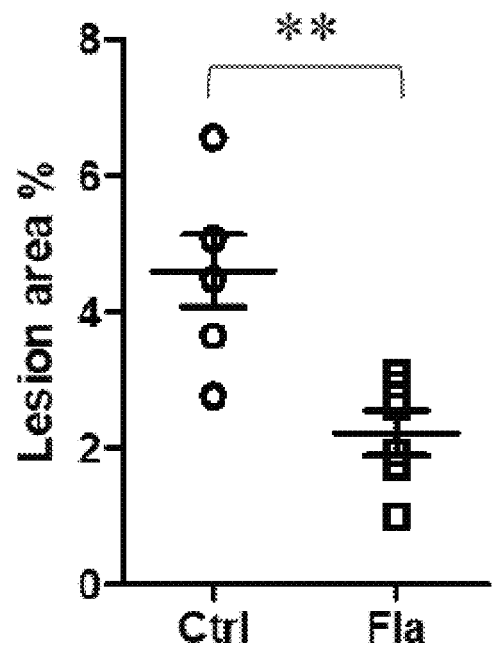
FIG. 5 is a dot plot showing the effect of oral supplementation of flagellin to mice on atherosclerotic lesions. 19 weeks old apoE-deficient mice were orally gavaged with a dose of 2.35 μg flagellin (FLA) every other day for 15 days, and the same volume of PBS vehicle were gavaged in the control group. The lipid content of aorta was visualized by staining with Oil Red 0 and the lesion area in aorta were analyzed by ImageJ software (n=6, * p<0.01).

Oral administration of flagellin, a natural agonist of TLR5, is able to increase apolipoprotein-A1 in both liver and serum, and HDL level in mice. Twelve to Fifteen-week old wild type mice and apoe−/− mice were treated with (Fla) or without (Veh) flagellin in drinking water, and fed a normal chow diet for 3 weeks. The hepatic (FIG. 4A) and circulating (FIG. 4B) apoA1 protein was determined by Western immunoblotting. HDL-C were measured using Stanbio™ HDL-Cholesterol Liquid Reagent in serum (FIG. 4C). (n=4). Oral supplementation of flagellin to mice stimulated hepatic apoA1 production and suppressed the formation of atherosclerotic lesions. 19 weeks old apoE-deficient mice were orally gavaged with a dose of 2.35 µg flagellin (FLA) every other day for 15 days, and the same volume of PBS vehicle were gavaged in the control group. The lipid content of aorta was visualized by staining with Oil Red 0 and the lesion area in aorta were analyzed by ImageJ software (FIG. 5).

These data show that activation of TLR5 (by administration of flagellin) stimulates the production of apolipoprotein-A1 in hepatocytes with a consequent increase in circulating HDL levels. TLR5 agonist acts on the receptor and turns on the MyD88 pathway in hepatocytes, resulting in the activation of a transcription factor, NFκB and subsequently stimulation of the transcription of apolipoprotein-AL which is the key component of HDL.

Previous studies had not recognized benefits associated with activation of TLr5 within the context of atherosclerosis. Kim et al., *Sci Rep* 6:25437 (2016) propose that inflammation induced by flagellin of bacteria facilitates development of atherosclerosis by activating TLR signaling system. Similarly, Ellenbroek, et al., *Sci Rep.* 2017 Feb. 16; 7:42688 (2017) proposes the absence of TLR5 as an advantage to atherosclerotic lesions, concluding that TLR5 deficiency inhibits atherosclerotic lesion formation.

Example 3: Oral Treatment of Flagellin does not Trigger Systemic Inflammation

Materials and Methods

Total cholesterol and HDL-C levels in serum, and ApoA1 expressions in liver and serum were determined in 18-20 week old NCD-fed Apoe-/-mice treated with flagellin (0.1 mg/kg) or vehicle (Veh) for 4 weeks.

The atherosclerotic lesions along the thoracic aorta and at the root of aortic arch were visualized by Oil Red 0 and H&E staining, and the lesion area and size were calculated.

Macrophage content in the atherosclerotic lesions was evaluated by immunohistochemical staining using anti-F4/80 and quantitatively analysed using Image J Software. The levels of various cytokines in circulation were determined by ELISA kits.

Results

Experiments were designed to determine if oral administration of flagellin induces systemic inflammation. Results show that oral treatment of flagellin induces HDL level and ameliorate lesion development without triggering systemic inflammation. The results are illustrated in FIGS. 6A-9C.

FIGS. 6A-6B show total cholesterol (6A) and HDL-C (6B) following vehicle ("veh") or flagellin ("Fla") treatment.

FIGS. 7A-7B show ApoA1 levels in the liver (7A) and serum (6B) following vehicle ("veh") or flagellin ("Fla") treatment.

Figure 8A:
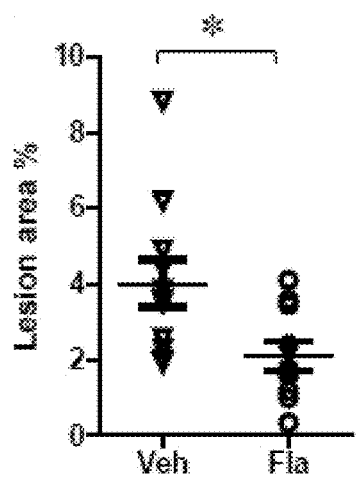
FIGS. 8A-8C are dot plots showing the lesion area (%) (8A), lesion size (pixels) (8B), F4/80 are (%) (8C), following vehicle ("veh") or flagellin ("Fla") treatment.
Figure 8B:
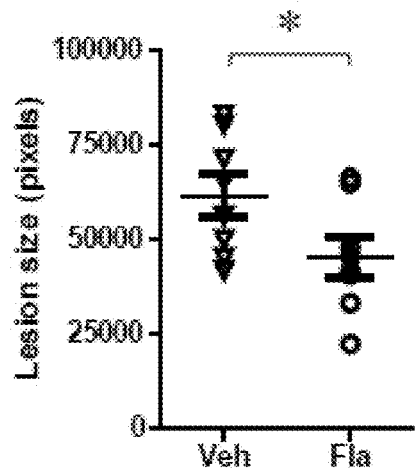
Figure 8C:
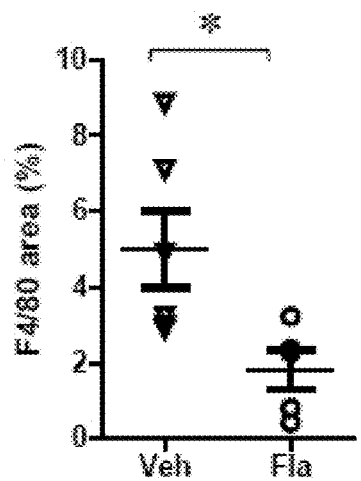

FIGS. 8A-8C show the lesion area (%) (8A), lesion size (pixels) (8B), F4/80 are (%) (8C), following vehicle ("veh") or flagellin ("Fla") treatment.

Figure 9A:
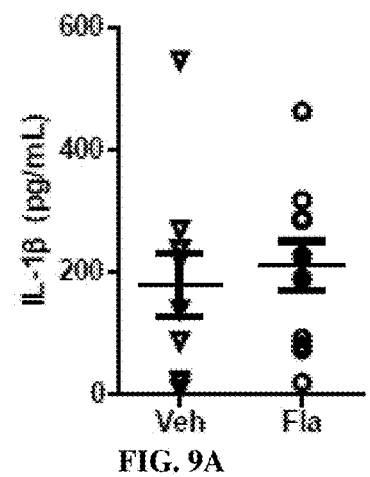
FIGS. 9A-9C are dot plots showing expression levels of IL-1β (9A), sTNFRII (9B), and CCL2 (9C), after vehicle ("veh") or flagellin ("Fla") treatment.
Figure 9B:
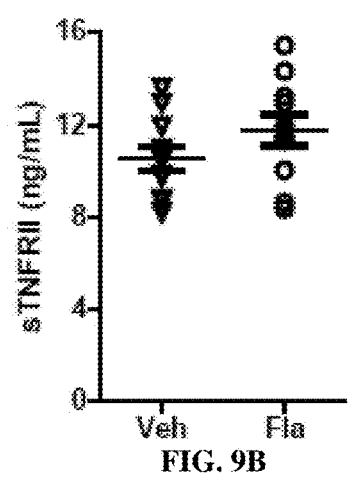
Figure 9C:
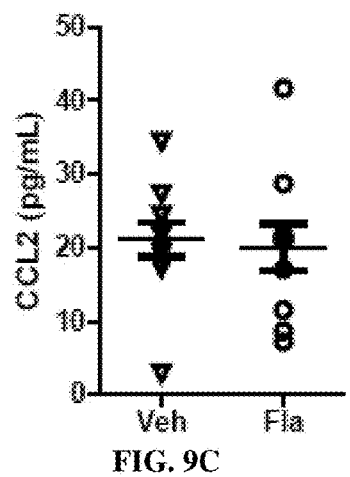

FIGS. 9A-9C show expression levels of Il-1B, sTNFRII, and CCL2 after vehicle ("veh") or flagellin ("Fla") treatment.

Example 4: HDL Level and Abundance of Genes from Flagellated Bacteria are Positively Correlated Materials and Methods Healthy male adult participants (BMI 25-30) were recruited, and serum and faeces were collected for measurement of serum lipids and isolation of faecal DNA. Faecal DNA was extracted using the QIAampDNA Stool Mini Kit (Qiagen), and subjected to whole genome shotgun metagenomics sequencing by Beijing Genomics Institute (Shenzhen, China). The sequenced data were subjected to analysis of representative flagellar proteins using DIAMOND alignment programme and InterPro2GO mapping using MEGAN6 (Universitat Tubingen). ApoA1 expression was determined by Western immunoblotting followed by densitometric evaluation.

Results

Experiments were designed to determine if there is a relationship between HDL level and expression of genes from flagellated bacteria. Results showed a positive correlation between HDL level and the abundance of genes representing flagellated bacteria in faeces of overweight individuals.

Figures 10A, 10B:
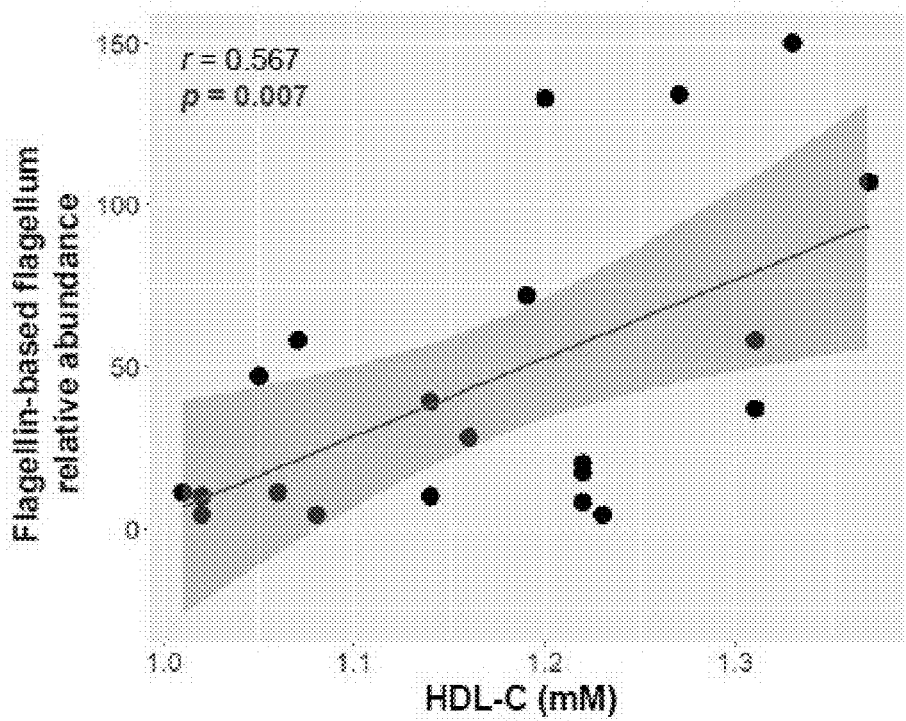
FIG. 10A is a Pearson correlation plot of the relative abundance of genes belonging to flagellin-based flagellum in faecal DNA and HDL-C level in overweight humans.
FIG. 10B is a Pearson correlation plot serum of ApoA1 expression and the abundance of genes belonging to flagellin family in faecal DNA. The grey area indicates the confidence interval. (n=21).

FIG. 10A shows a Pearson correlation of the relative abundance of genes belonging to flagellin-based flagellum in faecal DNA and HDL-C level in overweight individuals. FIG. 10B shows a Pearson correlation serum of ApoA1 expression and the abundance of genes belonging to flagellin family in faecal DNA. The grey area indicates the confidence interval. (n=21).

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

Those skilled in the art will recognize, or be able to ascertain using no more than routine experimentation, many equivalents to the specific embodiments of the invention described herein. Such equivalents are intended to be encompassed by the following claims.

We claim:

1. A method of reducing atherosclerotic lesions comprising administering to a subject with atherosclerosis a composition comprising an effective amount of *Salmonella typhimurium* flagellin to reduce atherosclerotic lesion formation.

2. The method of claim 1, wherein the composition is administered orally.

3. The method of claim 2, wherein the composition is administered in an effective amount to increase endogenous levels of ApoA1 in the subject's hepatocytes.

* * * * *

SEQUENCE LISTING

```
<160> NUMBER OF SEQ ID NOS: 21

<210> SEQ ID NO 1
<211> LENGTH: 585
<212> TYPE: PRT
<213> ORGANISM: Escherichia coli

<400> SEQUENCE: 1

Met Ala Gln Val Ile Asn Thr Asn Ser Leu Ser Leu Ile Thr Gln Asn
1               5                   10                  15
```

```
Asn Ile Asn Lys Asn Gln Ser Ala Leu Ser Ser Ser Ile Glu Arg Leu
             20                  25                  30

Ser Ser Gly Leu Arg Ile Asn Ser Ala Lys Asp Asp Ala Ala Gly Gln
         35                  40                  45

Ala Ile Ala Asn Arg Phe Thr Ser Asn Ile Lys Gly Leu Thr Gln Ala
 50                  55                  60

Ala Arg Asn Ala Asn Asp Gly Ile Ser Val Ala Gln Thr Thr Glu Gly
 65                  70                  75                  80

Ala Leu Ser Glu Ile Asn Asn Asn Leu Gln Arg Ile Arg Glu Leu Thr
                 85                  90                  95

Val Gln Ala Thr Thr Gly Thr Asn Ser Asp Ser Asp Leu Asp Ser Ile
            100                 105                 110

Gln Asp Glu Ile Lys Ser Arg Leu Asp Glu Ile Asp Arg Val Ser Gly
            115                 120                 125

Gln Thr Gln Phe Asn Gly Val Asn Val Leu Ala Lys Asp Gly Ser Met
            130                 135                 140

Lys Ile Gln Val Gly Ala Asn Asp Gly Glu Thr Ile Thr Ile Asp Leu
145                 150                 155                 160

Lys Lys Ile Asp Ser Asp Thr Leu Gly Leu Asn Gly Phe Asn Val Asn
                165                 170                 175

Gly Lys Gly Thr Ile Thr Asn Lys Ala Ala Thr Val Ser Asp Leu Thr
            180                 185                 190

Ser Ala Gly Ala Lys Leu Asn Thr Thr Thr Gly Leu Tyr Asp Leu Lys
            195                 200                 205

Thr Glu Asn Thr Leu Leu Thr Thr Asp Ala Ala Phe Asp Lys Leu Gly
            210                 215                 220

Asn Gly Asp Lys Val Thr Val Gly Gly Val Asp Tyr Thr Tyr Asn Ala
225                 230                 235                 240

Lys Ser Gly Asp Phe Thr Thr Thr Lys Ser Thr Ala Gly Thr Gly Val
                245                 250                 255

Asp Ala Ala Ala Gln Ala Ala Asp Ser Ala Ser Lys Arg Asp Ala Leu
            260                 265                 270

Ala Ala Thr Leu His Ala Asp Val Gly Lys Ser Val Asn Gly Ser Tyr
            275                 280                 285

Thr Thr Lys Asp Gly Thr Val Ser Phe Glu Thr Asp Ser Ala Gly Asn
            290                 295                 300

Ile Thr Ile Gly Gly Ser Gln Ala Tyr Val Asp Asp Ala Gly Asn Leu
305                 310                 315                 320

Thr Thr Asn Asn Ala Gly Ser Ala Ala Lys Ala Asp Met Lys Ala Leu
                325                 330                 335

Leu Lys Ala Ala Ser Glu Gly Ser Asp Gly Ala Ser Leu Thr Phe Asn
            340                 345                 350

Gly Thr Glu Tyr Thr Ile Ala Lys Ala Thr Pro Ala Thr Thr Thr Pro
            355                 360                 365

Val Ala Pro Leu Ile Pro Gly Gly Ile Thr Tyr Gln Ala Thr Val Ser
            370                 375                 380

Lys Asp Val Val Leu Ser Glu Thr Lys Ala Ala Ala Thr Ser Ser
385                 390                 395                 400

Ile Thr Phe Asn Ser Gly Val Leu Ser Lys Thr Ile Gly Phe Thr Ala
            405                 410                 415

Gly Glu Ser Ser Asp Ala Ala Lys Ser Tyr Val Asp Asp Lys Gly Gly
            420                 425                 430

Ile Thr Asn Val Ala Asp Tyr Thr Val Ser Tyr Ser Val Asn Lys Asp
```

```
                435                 440                 445
Asn Gly Ser Val Thr Val Ala Gly Tyr Ala Ser Ala Thr Asp Thr Asn
    450                 455                 460
Lys Asp Tyr Ala Pro Ala Ile Gly Thr Ala Val Asn Val Asn Ser Ala
465                 470                 475                 480
Gly Lys Ile Thr Thr Glu Thr Thr Ser Ala Gly Ser Ala Thr Thr Asn
                485                 490                 495
Pro Leu Ala Ala Leu Asp Asp Ala Ile Ser Ser Ile Asp Lys Phe Arg
                500                 505                 510
Ser Ser Leu Gly Ala Ile Gln Asn Arg Leu Asp Ser Ala Val Thr Asn
                515                 520                 525
Leu Asn Asn Thr Thr Thr Asn Leu Ser Glu Ala Gln Ser Arg Ile Gln
    530                 535                 540
Asp Ala Asp Tyr Ala Thr Glu Val Ser Asn Met Ser Lys Ala Gln Ile
545                 550                 555                 560
Ile Gln Gln Ala Gly Asn Ser Val Leu Ala Lys Ala Asn Gln Val Pro
                565                 570                 575
Gln Gln Val Leu Ser Leu Leu Gln Gly
                580                 585

<210> SEQ ID NO 2
<211> LENGTH: 506
<212> TYPE: PRT
<213> ORGANISM: Salmonella typhimurium

<400> SEQUENCE: 2

Met Ala Gln Val Ile Asn Thr Asn Ser Leu Ser Leu Leu Thr Gln Asn
1               5                   10                  15
Asn Leu Asn Lys Ser Gln Ser Ala Leu Gly Thr Ala Ile Glu Arg Leu
                20                  25                  30
Ser Ser Gly Leu Arg Ile Asn Ser Ala Lys Asp Asp Ala Ala Gly Gln
            35                  40                  45
Ala Ile Ala Asn Arg Phe Thr Ala Asn Ile Lys Gly Leu Thr Gln Ala
    50                  55                  60
Ser Arg Asn Ala Asn Asp Gly Ile Ser Ile Ala Gln Thr Thr Glu Gly
65                  70                  75                  80
Ala Leu Asn Glu Ile Asn Asn Asn Leu Gln Arg Val Arg Glu Leu Ala
                85                  90                  95
Val Gln Ser Ala Asn Ser Thr Asn Ser Gln Ser Asp Leu Asp Ser Ile
            100                 105                 110
Gln Ala Glu Ile Thr Gln Arg Leu Asn Glu Ile Asp Arg Val Ser Gly
        115                 120                 125
Gln Thr Gln Phe Asn Gly Val Lys Val Leu Ala Gln Asp Asn Thr Leu
    130                 135                 140
Thr Ile Gln Val Gly Ala Asn Asp Gly Glu Thr Ile Asp Ile Asp Leu
145                 150                 155                 160
Lys Gln Ile Asn Ser Gln Thr Leu Gly Leu Asp Ser Leu Asn Val Gln
                165                 170                 175
Lys Ala Tyr Asp Val Lys Asp Thr Ala Val Thr Thr Lys Ala Tyr Ala
            180                 185                 190
Asn Asn Gly Thr Thr Leu Asp Val Ser Gly Leu Asp Asp Ala Ala Ile
        195                 200                 205
Lys Ala Ala Thr Gly Gly Thr Asn Gly Thr Ala Ser Val Thr Gly Gly
    210                 215                 220
```

Ala Val Lys Phe Asp Ala Asp Asn Asn Lys Tyr Phe Val Thr Ile Gly
225                 230                 235                 240

Gly Phe Thr Gly Ala Asp Ala Ala Lys Asn Gly Asp Tyr Glu Val Asn
            245                 250                 255

Val Ala Thr Asp Gly Thr Val Thr Leu Ala Ala Gly Ala Thr Lys Thr
        260                 265                 270

Thr Met Pro Ala Gly Ala Thr Thr Lys Thr Glu Val Gln Glu Leu Lys
    275                 280                 285

Asp Thr Pro Ala Val Val Ser Ala Asp Ala Lys Asn Ala Leu Ile Ala
290                 295                 300

Gly Gly Val Asp Ala Thr Asp Ala Asn Gly Ala Glu Leu Val Lys Met
305                 310                 315                 320

Ser Tyr Thr Asp Lys Asn Gly Lys Thr Ile Glu Gly Gly Tyr Ala Leu
            325                 330                 335

Lys Ala Gly Asp Lys Tyr Tyr Ala Ala Asp Tyr Asp Glu Ala Thr Gly
            340                 345                 350

Ala Ile Lys Ala Lys Thr Thr Ser Tyr Thr Ala Ala Asp Gly Thr Thr
            355                 360                 365

Lys Thr Ala Ala Asn Gln Leu Gly Gly Val Asp Gly Lys Thr Glu Val
370                 375                 380

Val Thr Ile Asp Gly Lys Thr Tyr Asn Ala Ser Lys Ala Ala Gly His
385                 390                 395                 400

Asp Phe Lys Ala Gln Pro Glu Leu Ala Glu Ala Ala Lys Thr Thr
            405                 410                 415

Glu Asn Pro Leu Gln Lys Ile Asp Ala Ala Leu Ala Gln Val Asp Ala
            420                 425                 430

Leu Arg Ser Asp Leu Gly Ala Val Gln Asn Arg Phe Asn Ser Ala Ile
            435                 440                 445

Thr Asn Leu Gly Asn Thr Val Asn Asn Leu Ser Glu Ala Arg Ser Arg
            450                 455                 460

Ile Glu Asp Ser Asp Tyr Ala Thr Glu Val Ser Asn Met Ser Arg Ala
465                 470                 475                 480

Gln Ile Leu Gln Gln Ala Gly Thr Ser Val Leu Ala Gln Ala Asn Gln
            485                 490                 495

Val Pro Gln Asn Val Leu Ser Leu Leu Arg
            500                 505

<210> SEQ ID NO 3
<211> LENGTH: 329
<212> TYPE: PRT
<213> ORGANISM: Artificial Sequence
<220> FEATURE:
<223> OTHER INFORMATION: synthetic polypeptide

<400> SEQUENCE: 3

Met Arg Gly Ser His His His His His His Gly Met Ala Ser Met Thr
1               5                   10                  15

Gly Gly Gln Gln Met Gly Arg Asp Leu Tyr Asp Asp Asp Lys Asp
            20                  25                  30

Pro Met Ala Gln Val Ile Asn Thr Asn Ser Leu Ser Leu Leu Thr Gln
            35                  40                  45

Asn Asn Leu Asn Lys Ser Gln Ser Ser Leu Ser Ser Ala Ile Glu Arg
    50                  55                  60

Leu Ser Ser Gly Leu Arg Ile Asn Ser Ala Lys Asp Asp Ala Ala Gly
65                  70                  75                  80

```
Gln Ala Ile Ala Asn Arg Phe Thr Ser Asn Ile Lys Gly Leu Thr Gln
                85                  90                  95

Ala Ser Arg Asn Ala Asn Asp Gly Ile Ser Ile Ala Gln Thr Thr Glu
            100                 105                 110

Gly Ala Leu Asn Glu Ile Asn Asn Leu Gln Arg Val Arg Glu Leu
        115                 120                 125

Ser Val Gln Ala Thr Asn Gly Thr Asn Ser Asp Ser Asp Leu Lys Ser
    130                 135                 140

Ile Gln Asp Glu Ile Gln Arg Leu Glu Glu Ile Asp Arg Val Ser
145                 150                 155                 160

Asn Gln Thr Gln Phe Asn Gly Val Lys Val Leu Ser Gln Asp Asn Gln
                165                 170                 175

Met Lys Ile Gln Val Gly Ala Asn Asp Gly Glu Thr Ile Thr Ile Asp
            180                 185                 190

Leu Gln Lys Ile Asp Val Lys Ser Leu Gly Leu Asp Gly Phe Asn Val
        195                 200                 205

Asn Ser Pro Gly Ile Ser Gly Gly Gly Ile Leu Asp Ser Met
    210                 215                 220

Gly Thr Leu Ile Asn Glu Asp Ala Ala Ala Lys Lys Ser Thr Ala
225                 230                 235                 240

Asn Pro Leu Ala Ser Ile Asp Ser Ala Leu Ser Lys Val Asp Ala Val
                245                 250                 255

Arg Ser Ser Leu Gly Ala Ile Gln Asn Arg Phe Asp Ser Ala Ile Thr
            260                 265                 270

Asn Leu Gly Asn Thr Val Thr Asn Leu Asn Ser Ala Arg Ser Arg Ile
        275                 280                 285

Glu Asp Ala Asp Tyr Ala Thr Glu Val Ser Asn Met Ser Lys Ala Gln
    290                 295                 300

Ile Leu Gln Gln Ala Gly Thr Ser Val Leu Ala Gln Ala Asn Gln Val
305                 310                 315                 320

Pro Gln Asn Val Leu Ser Leu Leu Arg
                325

<210> SEQ ID NO 4
<211> LENGTH: 12
<212> TYPE: PRT
<213> ORGANISM: Artificial Sequence
<220> FEATURE:
<223> OTHER INFORMATION: synthetic polypeptide

<400> SEQUENCE: 4

Gly Ala Val Gln Asn Arg Phe Asn Ser Ala Ile Thr
1               5                   10

<210> SEQ ID NO 5
<211> LENGTH: 12
<212> TYPE: PRT
<213> ORGANISM: Artificial Sequence
<220> FEATURE:
<223> OTHER INFORMATION: synthetic polypeptide

<400> SEQUENCE: 5

Gly Ala Val Ala Asn Arg Phe Asn Ser Ala Ile Thr
1               5                   10

<210> SEQ ID NO 6
<211> LENGTH: 12
<212> TYPE: PRT
<213> ORGANISM: Artificial Sequence
```

```
<220> FEATURE:
<223> OTHER INFORMATION: synthetic polypeptide

<400> SEQUENCE: 6

Gly Ala Val Gln Asn Ala Phe Asn Ser Ala Ile Thr
1               5                   10

<210> SEQ ID NO 7
<211> LENGTH: 18
<212> TYPE: PRT
<213> ORGANISM: Artificial Sequence
<220> FEATURE:
<223> OTHER INFORMATION: synthetic polypeptide

<400> SEQUENCE: 7

Ala Asp Thr Arg Asp Leu Gly Ala Val Gln Asn Arg Phe Asn Ser Ala
1               5                   10                  15

Ile Thr

<210> SEQ ID NO 8
<211> LENGTH: 18
<212> TYPE: PRT
<213> ORGANISM: Artificial Sequence
<220> FEATURE:
<223> OTHER INFORMATION: synthetic polypeptide

<400> SEQUENCE: 8

Val Asp Ala Arg Asp Leu Gly Ala Val Gln Asn Arg Phe Asn Ser Ala
1               5                   10                  15

Ile Thr

<210> SEQ ID NO 9
<211> LENGTH: 18
<212> TYPE: PRT
<213> ORGANISM: Artificial Sequence
<220> FEATURE:
<223> OTHER INFORMATION: synthetic polypeptide

<400> SEQUENCE: 9

Val Asp Thr Ala Asp Leu Gly Ala Val Gln Asn Arg Phe Asn Ser Ala
1               5                   10                  15

Ile Thr

<210> SEQ ID NO 10
<211> LENGTH: 39
<212> TYPE: PRT
<213> ORGANISM: Artificial Sequence
<220> FEATURE:
<223> OTHER INFORMATION: synthetic polypeptide

<400> SEQUENCE: 10

Gly Ala Leu Asn Glu Ile Asn Asn Asn Leu Gln Arg Val Arg Glu Leu
1               5                   10                  15

Ala Val Gln Ser Ala Asn Ser Thr Asn Ser Gln Ser Asp Leu Asp Ser
            20                  25                  30

Ile Gln Ala Glu Ile Thr Gln
        35

<210> SEQ ID NO 11
<211> LENGTH: 44
<212> TYPE: PRT
<213> ORGANISM: Artificial Sequence
<220> FEATURE:
<223> OTHER INFORMATION: synthetic polypeptide
```

```
<400> SEQUENCE: 11

Thr Gln Phe Ser Gly Val Lys Val Leu Ala Gln Asp Asn Thr Leu Thr
1               5                  10                  15

Ile Gln Val Gly Ala Asn Asp Gly Glu Thr Ile Asp Ile Asp Leu Lys
            20                  25                  30

Gln Ile Asn Ser Gln Thr Leu Gly Leu Asp Thr Leu
        35                  40

<210> SEQ ID NO 12
<211> LENGTH: 50
<212> TYPE: PRT
<213> ORGANISM: Artificial Sequence
<220> FEATURE:
<223> OTHER INFORMATION: synthetic polypeptide

<400> SEQUENCE: 12

Glu Gly Ala Leu Asn Glu Ile Asn Asn Asn Leu Gln Arg Val Arg Glu
1               5                  10                  15

Leu Ala Val Gln Ser Ala Asn Ser Thr Asn Ser Gln Ser Asp Leu Asp
            20                  25                  30

Ser Ile Gln Ala Glu Ile Thr Gln Arg Leu Asn Glu Ile Asp Arg Val
        35                  40                  45

Asn Gly
    50

<210> SEQ ID NO 13
<211> LENGTH: 98
<212> TYPE: PRT
<213> ORGANISM: Artificial Sequence
<220> FEATURE:
<223> OTHER INFORMATION: synthetic polypeptide

<400> SEQUENCE: 13

Met Ala Gln Val Ile Asn Thr Asn Ser Leu Ser Leu Leu Thr Gln Asn
1               5                  10                  15

Asn Leu Asn Lys Ser Gln Ser Ala Leu Gly Thr Ala Ile Glu Arg Leu
            20                  25                  30

Ser Ser Gly Leu Arg Ile Asn Ser Ala Lys Asp Asp Ala Ala Gly Gln
        35                  40                  45

Ala Ile Ala Asn Phe Thr Ala Asn Ile Lys Gly Leu Thr Gln Ala Ser
    50                  55                  60

Arg Asn Ala Asn Asp Gly Ile Ser Ile Ala Gln Thr Thr Glu Gly Ala
65                  70                  75                  80

Leu Asn Glu Ile Asn Asn Asn Leu Gln Arg Val Arg Glu Leu Ala Val
                85                  90                  95

Gln Ser

<210> SEQ ID NO 14
<211> LENGTH: 32
<212> TYPE: PRT
<213> ORGANISM: Artificial Sequence
<220> FEATURE:
<223> OTHER INFORMATION: synthetic polypeptide

<400> SEQUENCE: 14

Leu Gln Lys Ile Asp Ala Ala Leu Ala Gln Val Asp Thr Leu Arg Ser
1               5                  10                  15

Asp Leu Gly Ala Val Gln Asn Arg Phe Asn Ser Ala Ile Thr Asn Leu
            20                  25                  30
```

<210> SEQ ID NO 15
<211> LENGTH: 29
<212> TYPE: PRT
<213> ORGANISM: Artificial Sequence
<220> FEATURE:
<223> OTHER INFORMATION: synthetic polypeptide

<400> SEQUENCE: 15

Thr Leu Arg Ser Asp Leu Gly Ala Val Gln Asn Arg Phe Asn Ser Ala
1               5                   10                  15

Ile Thr Asn Leu Gly Asn Thr Val Asn Asn Leu Ser Ser
            20                  25

<210> SEQ ID NO 16
<211> LENGTH: 51
<212> TYPE: PRT
<213> ORGANISM: Artificial Sequence
<220> FEATURE:
<223> OTHER INFORMATION: synthetic polypeptide

<400> SEQUENCE: 16

Glu Gln Ala Ala Lys Thr Thr Glu Asn Pro Leu Gln Lys Ile Asp Ala
1               5                   10                  15

Ala Leu Ala Gln Val Asp Thr Leu Arg Ser Asp Leu Gly Ala Val Gln
            20                  25                  30

Asn Arg Phe Asn Ser Ala Ile Thr Asn Leu Gly Asn Thr Val Asn Asn
        35                  40                  45

Leu Ser Ser
    50

<210> SEQ ID NO 17
<211> LENGTH: 377
<212> TYPE: PRT
<213> ORGANISM: Clostridium tyrobutyricum

<400> SEQUENCE: 17

Met Ile Ile Asn His Asn Leu Met Ala Asn Asn Ala Leu Arg Asn Met
1 5 10 15

Asn Val Asn Ser Asn Asn Ala Ser Lys Ala Met Glu Lys Leu Ser Ser
20 25 30

Gly Leu Arg Ile Asn Arg Ala Gly Asp Asp Ala Ala Gly Leu Ala Ile
35 40 45

Ser Glu Lys Met Arg Gly Gln Ile Asn Gly Leu Asn Gln Ala Ser Ser
50 55 60

Asn Ala Gln Asp Ser Ile Ser Leu Ile Gln Thr Ala Glu Gly Ala Leu
65 70 75 80

Asn Glu Thr His Ser Ile Leu Gln Arg Met Arg Thr Leu Ala Val Gln
85 90 95

Ser Ser Asn Asp Thr Asn Thr Thr Thr Asp Arg Ser Ala Ile Gln Asp
100 105 110

Glu Val Asn Gln Leu Thr Asp Glu Ile Asp Arg Ile Ala Asn Thr Thr
115 120 125

Glu Phe Asn Thr Gln Lys Leu Leu Asp Gly Ser Lys Val Gly Leu Val
130 135 140

Asp Ala Lys Asp Ala Asp Ala Ser Val Gln Leu Asn Thr Ser Ala Asn
145 150 155 160

Ile Ser Leu Ala Ser Asn Phe Ser Thr Thr Ser Ala Thr Gly Ile Ala
165 170 175

-continued

```
Asp Ser Phe Thr Val Thr Ile Thr Arg Thr His Gly Thr Ala Gly Ala
            180                 185                 190

Thr Phe Ala Ser Thr Asp Tyr Asp Val Ala Leu Val Gly Gly Thr Glu
            195                 200                 205

Leu Ile Glu His Ser Ser Ser Leu Thr Tyr Asp Thr Lys Ala Ile
            210                 215                 220

Asn Leu Val Gly Met Ile Lys Cys Phe Ser Ile Arg Thr Asn Asp Thr
225                 230                 235                 240

Ile Arg Lys Val Ser His Val Arg Thr Val Lys Ala Leu Ser Met Gln
                    245                 250                 255

Ile Gly Ala Ile Val Thr Asn Met Leu Ile Gly Ile Asn Ser Met Lys
                260                 265                 270

Ala Thr Asp Ile Gly Val Arg Asn Thr Ser Gly Lys Ala Leu Asp Ile
            275                 280                 285

Ser Thr Ala Ser Lys Ala Thr Gly Ala Ile Thr Gln Ile Asn Asn Ala
            290                 295                 300

Ile Glu Thr Val Ser Thr Gln Arg Ser Lys Leu Gly Ala Tyr Gln Asn
305                 310                 315                 320

Arg Leu Glu His Thr Ile Asn Asn Leu Gly Thr Ser Ser Glu Asn Leu
                    325                 330                 335

Thr Ser Ala Glu Ser Arg Ile Arg Asp Val Asp Met Ala Ser Glu Met
                340                 345                 350

Ser Glu Tyr Ser Lys Asn Asn Ile Leu Ser Gln Thr Ala Gln Ala Met
            355                 360                 365

Leu Ala Gln Ala Asn Gln Gln Thr Gln
370                 375

<210> SEQ ID NO 18
<211> LENGTH: 291
<212> TYPE: PRT
<213> ORGANISM: Clostridium difficile

<400> SEQUENCE: 18

Met Arg Val Asn Thr Asn Val Ser Ala Leu Ile Ala Asn Asn Gln Met
1               5                   10                  15

Gly Arg Asn Val Asn Ala Gln Ser Lys Ser Met Glu Lys Leu Ser Ser
            20                  25                  30

Gly Val Arg Ile Lys Arg Ala Ala Asp Asp Ala Ala Gly Leu Ala Ile
        35                  40                  45

Ser Glu Lys Met Arg Ala Gln Ile Lys Gly Leu Asp Gln Ala Gly Arg
    50                  55                  60

Asn Val Gln Asp Gly Ile Ser Val Val Gln Thr Ala Glu Gly Ala Leu
65                  70                  75                  80

Glu Glu Thr Gly Asn Ile Leu Gln Arg Met Arg Thr Leu Ser Val Gln
                85                  90                  95

Ser Ser Asn Glu Thr Asn Thr Ala Glu Glu Arg Gln Lys Ile Ala Asp
            100                 105                 110

Glu Leu Leu Gln Leu Lys Asp Glu Val Glu Arg Ile Ser Ser Ser Ile
        115                 120                 125

Glu Phe Asn Gly Lys Lys Leu Leu Asp Gly Ser Ser Thr Glu Ile Arg
    130                 135                 140

Leu Gln Val Gly Ala Asn Phe Gly Thr Asn Val Ala Gly Thr Ser Asn
145                 150                 155                 160

Asn Asn Asn Glu Ile Lys Val Ala Leu Val Asn Thr Ser Ser Ile Met
```

```
            165                 170                 175

Ser Lys Ala Gly Ile Thr Ser Thr Ile Ala Ser Leu Asn Ala Asp
        180                 185                 190

Gly Thr Ser Gly Thr Asn Ala Ala Lys Gln Met Val Ser Ser Leu Asp
        195                 200                 205

Val Ala Leu Lys Glu Leu Asn Thr Ser Arg Ala Lys Leu Gly Ala Gln
        210                 215                 220

Gln Asn Arg Leu Glu Ser Thr Gln Asn Leu Asn Asn Thr Ile Glu
225                 230                 235                 240

Asn Val Thr Ala Ala Glu Ser Arg Ile Arg Asp Thr Asp Val Ala Ser
                245                 250                 255

Glu Met Val Asn Leu Ser Lys Met Asn Ile Leu Val Gln Ala Ser Gln
                260                 265                 270

Ser Met Leu Ala Gln Ala Asn Gln Gln Pro Gln Gly Val Leu Gln Leu
                275                 280                 285

Leu Gly Ser
        290

<210> SEQ ID NO 19
<211> LENGTH: 505
<212> TYPE: PRT
<213> ORGANISM: Salmonella dublin

<400> SEQUENCE: 19

Met Ala Gln Val Ile Asn Thr Asn Ser Leu Ser Leu Leu Thr Gln Asn
1               5                   10                  15

Asn Leu Asn Lys Ser Gln Ser Ser Leu Ser Ser Ala Ile Glu Arg Leu
                20                  25                  30

Ser Ser Gly Leu Arg Ile Asn Ser Ala Lys Asp Asp Ala Ala Gly Gln
            35                  40                  45

Ala Ile Ala Asn Arg Phe Thr Ser Asn Ile Lys Gly Leu Thr Gln Ala
        50                  55                  60

Ser Arg Asn Ala Asn Asp Gly Ile Ser Ile Ala Gln Thr Thr Glu Gly
65                  70                  75                  80

Ala Leu Asn Glu Ile Asn Asn Asn Leu Gln Arg Val Arg Glu Leu Ser
                85                  90                  95

Val Gln Ala Thr Asn Gly Thr Asn Ser Asp Ser Asp Leu Lys Ser Ile
                100                 105                 110

Gln Asp Glu Ile Gln Gln Arg Leu Glu Glu Ile Asp Arg Val Ser Asn
            115                 120                 125

Gln Thr Gln Phe Asn Gly Val Lys Val Leu Ser Gln Asp Asn Gln Met
        130                 135                 140

Lys Ile Gln Val Gly Ala Asn Asp Gly Glu Thr Ile Thr Ile Asp Leu
145                 150                 155                 160

Gln Lys Ile Asp Val Lys Ser Leu Gly Leu Asp Gly Phe Asn Val Asn
                165                 170                 175

Gly Pro Lys Glu Ala Thr Val Gly Asp Leu Lys Ser Ser Phe Lys Asn
                180                 185                 190

Val Thr Gly Tyr Asp Thr Tyr Ala Ala Gly Ala Asp Lys Tyr Arg Val
            195                 200                 205

Asp Ile Asn Ser Gly Ala Val Val Thr Asp Ala Ala Ala Pro Asp Lys
        210                 215                 220

Val Tyr Val Asn Ala Ala Asn Gly Gln Leu Thr Thr Asp Asp Ala Glu
225                 230                 235                 240
```

-continued

Asn Asn Thr Ala Val Asp Leu Phe Lys Thr Thr Lys Ser Thr Ala Gly
                        245                 250                 255

Thr Ala Glu Ala Lys Ala Ile Ala Gly Ala Ile Lys Gly Gly Lys Glu
            260                 265                 270

Gly Asp Thr Phe Asp Tyr Lys Gly Val Thr Phe Thr Ile Asp Thr Lys
        275                 280                 285

Thr Gly Asp Asp Gly Asn Gly Lys Val Ser Thr Thr Ile Asn Gly Glu
    290                 295                 300

Lys Val Thr Leu Thr Val Ala Asp Ile Ala Thr Gly Ala Ala Asp Val
305                 310                 315                 320

Asn Ala Ala Thr Leu Gln Ser Ser Lys Asn Val Tyr Thr Ser Val Val
                325                 330                 335

Asn Gly Gln Phe Thr Phe Asp Asp Lys Thr Lys Asn Glu Ser Ala Lys
            340                 345                 350

Leu Ser Asp Leu Glu Ala Asn Asn Ala Val Lys Gly Glu Ser Lys Ile
        355                 360                 365

Thr Val Asn Gly Ala Glu Tyr Thr Ala Asn Ala Thr Gly Asp Lys Ile
    370                 375                 380

Thr Leu Ala Gly Lys Thr Met Phe Ile Asp Lys Thr Ala Ser Gly Val
385                 390                 395                 400

Ser Thr Leu Ile Asn Glu Asp Ala Ala Ala Lys Lys Ser Thr Ala
                405                 410                 415

Asn Pro Leu Ala Ser Ile Asp Ser Ala Leu Ser Lys Val Asp Ala Val
            420                 425                 430

Arg Ser Ser Leu Gly Ala Ile Gln Asn Arg Phe Asp Ser Ala Ile Thr
        435                 440                 445

Asn Leu Gly Asn Thr Val Thr Asn Leu Asn Ser Ala Arg Ser Arg Ile
    450                 455                 460

Glu Asp Ala Asp Tyr Ala Thr Glu Val Ser Asn Met Ser Lys Ala Gln
465                 470                 475                 480

Ile Leu Gln Gln Ala Gly Thr Ser Val Leu Ala Gln Ala Asn Gln Val
                485                 490                 495

Pro Gln Asn Val Leu Ser Leu Leu Arg
            500                 505

<210> SEQ ID NO 20
<211> LENGTH: 413
<212> TYPE: PRT
<213> ORGANISM: Clostridium chauvoei

<400> SEQUENCE: 20

Met Ile Ile Asn His Asn Met Asn Ala Leu Asn Ala His Arg Asn Met
1               5                   10                  15

Met Gly Asn Ile Ala Thr Ala Gly Lys Ser Met Glu Lys Leu Ser Ser
                20                  25                  30

Gly Leu Arg Ile Asn Arg Ala Gly Asp Asp Ala Gly Leu Ala Ile
            35                  40                  45

Ser Glu Lys Met Arg Gly Gln Ile Arg Gly Leu Asp Gln Ala Ser Arg
    50                  55                  60

Asn Ala Gln Asp Gly Ile Ser Leu Ile Gln Thr Ala Glu Gly Ala Leu
65                  70                  75                  80

Ala Glu Thr His Ser Ile Leu Gln Arg Met Arg Glu Leu Ser Val Gln
                85                  90                  95

Ser Ala Asn Asp Thr Asn Val Ala Val Asp Arg Thr Ala Ile Gln Asp
            100                 105                 110

```
Glu Ile Asn Ser Leu Thr Glu Ile Asn Arg Ile Ser Gly Asp Thr
            115                 120                 125

Glu Phe Asn Thr Gln Lys Leu Leu Asp Gly Gly Phe Lys Gly Glu Phe
130                 135                 140

Gln Ile Gly Ala Asn Ser Asn Gln Thr Val Lys Leu Asp Ile Gly Asn
145                 150                 155                 160

Met Ser Ala Ala Ser Leu Gly Leu Thr Thr Asn Ser Leu Glu Ser
            165                 170                 175

Lys Ala Leu Thr Lys Asp Ser Asn Leu Ala Asp Gly Thr Tyr Lys Ile
            180                 185                 190

Ser Gly Lys Asn Leu Val Asp Thr Asn Gly Asn Ser Val Gly Thr Phe
            195                 200                 205

Asp Ala Ala Ser Lys Lys Ile Thr Val Asn Gly Lys Asp Thr Val Phe
210                 215                 220

Asp Lys Ala Ala Leu Ala Glu Asn Ala Val Leu Thr Val Lys Ser Gly
225                 230                 235                 240

Thr Ala Glu Ile Lys Asn Thr Met Thr Gly Ala Ala Thr Lys Leu Ser
            245                 250                 255

Ser Gly Asn Tyr Glu Ile Lys Gly Thr Asn Val Ile Lys Asp Gly Lys
            260                 265                 270

Leu Ala Gly Thr Phe Asp Ala Ala Lys Lys Leu Thr Ile Asp Gly
            275                 280                 285

Val Gly Asp Val Ser Glu Ala Glu Leu Gly Phe Gln Thr Ser Lys Met
            290                 295                 300

Leu Asp Lys Val Ser Phe Thr Ile Asn Gly Ser Asp Val Ser Thr Arg
305                 310                 315                 320

Glu Leu Ala Ser Gly Ser Ile Lys Thr Ile Asn Ser Ala Ile Glu Gln
            325                 330                 335

Val Ser Thr Gln Arg Ser Lys Leu Gly Ala Val Gln Asn Arg Leu Glu
            340                 345                 350

His Thr Ile Asn Asn Leu Asn Thr Ser Ser Glu Asn Leu Thr Ala Ala
            355                 360                 365

Glu Ser Arg Val Arg Asp Val Asp Met Ala Lys Glu Met Met Ala Phe
            370                 375                 380

Ser Lys Asn Asn Ile Leu Ser Gln Ala Ala Gln Ala Met Leu Gly Gln
385                 390                 395                 400

Ala Asn Gln Gln Pro Gln Gly Val Leu Gln Leu Arg
            405                 410

<210> SEQ ID NO 21
<211> LENGTH: 304
<212> TYPE: PRT
<213> ORGANISM: Bacillus subtilis

<400> SEQUENCE: 21

Met Arg Ile Asn His Asn Ile Ala Ala Leu Asn Thr Leu Asn Arg Leu
1               5                   10                  15

Ser Ser Asn Asn Ser Ala Ser Gln Lys Asn Met Glu Lys Leu Ser Ser
            20                  25                  30

Gly Leu Arg Ile Asn Arg Ala Gly Asp Ala Ala Gly Leu Ala Ile
            35                  40                  45

Ser Glu Lys Met Arg Gly Gln Ile Arg Gly Leu Glu Met Ala Ser Lys
            50                  55                  60

Asn Ser Gln Asp Gly Ile Ser Leu Ile Gln Thr Ala Glu Gly Ala Leu
```

```
                65                  70                  75                  80

Thr Glu Thr His Ala Ile Leu Gln Arg Val Arg Glu Leu Val Val Gln
                85                  90                  95

Ala Gly Asn Thr Gly Thr Gln Asp Lys Ala Thr Asp Leu Gln Ser Ile
            100                 105                 110

Gln Asp Glu Ile Ser Ala Leu Thr Asp Glu Ile Asp Gly Ile Ser Asn
        115                 120                 125

Arg Thr Glu Phe Asn Gly Lys Lys Leu Leu Asp Gly Thr Tyr Lys Val
    130                 135                 140

Asp Thr Ala Thr Pro Ala Asn Gln Lys Asn Leu Val Phe Gln Ile Gly
145                 150                 155                 160

Ala Asn Ala Thr Gln Gln Ile Ser Val Asn Ile Glu Asp Met Gly Ala
            165                 170                 175

Asp Ala Leu Gly Ile Lys Glu Ala Asp Gly Ser Ile Ala Ala Leu His
        180                 185                 190

Ser Val Asn Asp Leu Asp Val Thr Lys Phe Ala Asp Asn Ala Ala Asp
        195                 200                 205

Thr Ala Asp Ile Gly Phe Asp Ala Gln Leu Lys Val Val Asp Glu Ala
    210                 215                 220

Ile Asn Gln Val Ser Ser Gln Arg Ala Lys Leu Gly Ala Val Gln Asn
225                 230                 235                 240

Arg Leu Glu His Thr Ile Asn Asn Leu Ser Ala Ser Gly Glu Asn Leu
            245                 250                 255

Thr Ala Ala Glu Ser Arg Ile Arg Asp Val Asp Met Ala Lys Glu Met
            260                 265                 270

Ser Glu Phe Thr Lys Asn Asn Ile Leu Ser Gln Ala Ser Gln Ala Met
        275                 280                 285

Leu Ala Gln Ala Asn Gln Gln Pro Gln Asn Val Leu Gln Leu Leu Arg
    290                 295                 300
```